US009911436B2

(12) United States Patent
Nakamura et al.

(10) Patent No.: US 9,911,436 B2
(45) Date of Patent: Mar. 6, 2018

(54) SOUND RECOGNITION APPARATUS, SOUND RECOGNITION METHOD, AND SOUND RECOGNITION PROGRAM

(71) Applicant: HONDA MOTOR CO., LTD., Tokyo (JP)

(72) Inventors: Keisuke Nakamura, Wako (JP); Kazuhiro Nakadai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 14/468,576

(22) Filed: Aug. 26, 2014

(65) Prior Publication Data
US 2015/0066507 A1 Mar. 5, 2015

(30) Foreign Application Priority Data

Sep. 2, 2013 (JP) .................................. 2013-181521

(51) Int. Cl.
*G10L 15/14* (2006.01)
*G10L 25/48* (2013.01)
(Continued)

(52) U.S. Cl.
CPC ............ *G10L 25/51* (2013.01); *G10L 15/142* (2013.01); *G10L 25/48* (2013.01); *G10L 15/187* (2013.01); *G10L 25/78* (2013.01)

(58) Field of Classification Search
CPC .............................. G10L 15/142; G10L 25/48
See application file for complete search history.

(56) References Cited

U.S. PATENT DOCUMENTS

| 6,167,095 A | * | 12/2000 | Furukawa | ................. H04J 1/12 |
| | | | | 370/468 |
| 6,246,982 B1 | * | 6/2001 | Beigi | ...................... G10L 15/10 |
| | | | | 704/238 |

(Continued)

FOREIGN PATENT DOCUMENTS

| JP | 2003-255984 A | 9/2003 |
| JP | 2005-173569 A | 6/2005 |

(Continued)

OTHER PUBLICATIONS

Japan Patent Office, Notice of Allowance corresponding to Japanese Patent Application No. 2013-181521, dated Jan. 24, 2017.

*Primary Examiner* — Paras D Shah
*Assistant Examiner* — Bryan S Blankenagel
(74) *Attorney, Agent, or Firm* — Squire Patton Boggs (US) LLP

(57) ABSTRACT

A sound recognition apparatus can include a sound feature value calculating unit configured to calculate a sound feature value based on a sound signal, and a label converting unit configured to convert the sound feature value into a corresponding label with reference to label data in which sound feature values and labels indicating sound units are correlated. A sound identifying unit is configured to calculate a probability of each sound unit group sequence that a label sequence is segmented for each sound unit group with reference to segmentation data. The segmentated data indicates a probability that a sound unit sequence will be segmented into at least one sound unit group. The sound identity unit can also identify a sound event corresponding to the sound unit group sequence selected based on the calculated probability.

5 Claims, 14 Drawing Sheets

(51) Int. Cl.
*G10L 25/51* (2013.01)
*G10L 15/187* (2013.01)
*G10L 25/78* (2013.01)

(56) References Cited

U.S. PATENT DOCUMENTS

| | | | | |
|---|---|---|---|---|
| 8,037,006 B2* | 10/2011 | Yen | ............ | G10L 17/26 706/16 |
| 2003/0086341 A1* | 5/2003 | Wells | ............ | G06F 17/30017 369/13.56 |
| 2004/0193419 A1* | 9/2004 | Kimball | ............ | G10L 25/78 704/256 |
| 2005/0027514 A1* | 2/2005 | Zhang | ............ | G10L 25/48 704/205 |
| 2005/0171948 A1* | 8/2005 | Knight | ............ | G06F 17/30616 |
| 2006/0210157 A1* | 9/2006 | Agnihotri | ............ | G06F 17/30793 382/173 |
| 2008/0267416 A1* | 10/2008 | Goldstein | ............ | H04R 1/1091 381/56 |
| 2009/0177484 A1* | 7/2009 | Davis | ............ | G06Q 30/02 705/346 |
| 2009/0210220 A1* | 8/2009 | Mitsuyoshi | ............ | G10L 25/90 704/207 |
| 2010/0208902 A1* | 8/2010 | Yoshizawa | ............ | G10L 21/0208 381/56 |
| 2011/0166859 A1* | 7/2011 | Suzuki | ............ | G10L 15/06 704/246 |
| 2011/0208521 A1* | 8/2011 | McClain | ............ | G10L 15/142 704/233 |
| 2011/0222785 A1* | 9/2011 | Hirohata | ............ | G06K 9/00288 382/224 |
| 2012/0027065 A1* | 2/2012 | Ray | ............ | H04L 27/2647 375/224 |
| 2012/0197644 A1* | 8/2012 | Nagano | ............ | G10L 15/1807 704/254 |
| 2012/0224706 A1* | 9/2012 | Hwang | ............ | G10L 15/10 381/56 |
| 2013/0179449 A1* | 7/2013 | Balcan | ............ | G06F 17/30867 707/737 |

FOREIGN PATENT DOCUMENTS

| | | |
|---|---|---|
| JP | 2005-189832 A | 7/2005 |
| JP | 2008-241991 A | 10/2008 |
| JP | 2009-139894 A | 6/2009 |
| JP | 2011-250100 A | 12/2011 |
| JP | 2012-133226 A | 7/2012 |
| JP | 2013-013066 A | 1/2013 |
| JP | 2013-142870 A | 7/2013 |
| JP | 2013-160930 A | 8/2013 |
| WO | 2011/033597 A1 | 3/2011 |
| WO | 2011/132410 A1 | 10/2011 |

* cited by examiner

FIG. 2

| LABEL | CLUSTER CENTROID |
|---|---|
| $c_1$ | $[x_1]$ |
| $c_2$ | $[x_2]$ |
| $c_3$ | $[x_3]$ |
| ... | ... |

| LABEL | SOUND UNIT UNIGRAM |
|---|---|
| $c_1$ | $p(c_1)$ |
| $c_2$ | $p(c_2)$ |
| $c_3$ | $p(c_3)$ |
| ... | ... |

(b)

| LABEL | SOUND UNIT BIGRAM |
|---|---|
| $c_1 c_1$ | $p(c_1|c_1)$ |
| $c_1 c_2$ | $p(c_1|c_2)$ |
| $c_1 c_3$ | $p(c_1|c_3)$ |
| ... | ... |

(c)

| LABEL | SOUND UNIT TRIGRAM |
|---|---|
| $c_1 c_1 c_1$ | $p(c_1|c_1 c_1)$ |
| $c_1 c_1 c_2$ | $p(c_1|c_1 c_2)$ |
| $c_1 c_1 c_3$ | $p(c_1|c_1 c_3)$ |
| ... | ... |

| LABEL | SOUND UNIT UNIGRAM |
|---|---|
| $w_1$ | $p(w_1)$ |
| $w_2$ | $p(w_2)$ |
| $w_3$ | $p(w_3)$ |
| ... | ... |

(b)

| LABEL | SOUND UNIT BIGRAM |
|---|---|
| $w_1 w_1$ | $p(w_1|w_1)$ |
| $w_1 w_2$ | $p(w_1|w_2)$ |
| $w_1 w_3$ | $p(w_1|w_3)$ |
| ... | ... |

(c)

| LABEL | SOUND UNIT TRIGRAM |
|---|---|
| $w_1 w_1 w_1$ | $p(w_1|w_1 w_1)$ |
| $w_1 w_1 w_2$ | $p(w_1|w_1 w_2)$ |
| $w_1 w_1 w_3$ | $p(w_1|w_1 w_3)$ |
| ... | ... |

...

| EVENT | SOUND UNIT GROUP SEQUENCE |
|---|---|
| $e_1$ | $c_1c_1 \mid c_1c_1$ ⋯ |
| $e_2$ | $c_1c_1 \mid c_2c_1$ ⋯ |
| $e_3$ | $c_1c_2 \mid c_1c_1$ ⋯ |
| ⋯ | ⋯ |

FIG. 21

| SN RATIO (dB) | GMM-S | EMBODIMENT |
|---|---|---|
| ∞ | 82.1 | 74.1 |
| 12.8 | 47.8 | 50.1 |
| 9.5 | 34.8 | 41.7 |
| 7.5 | 28.4 | 36.8 |
| 6.0 | 24.1 | 33.4 |
| 3.7 | 19.1 | 28.2 |
| 0.0 | 12.3 | 19.8 |
| -3.7 | 7.1 | 11.8 |

FIG. 22

| SN RATIO (dB) | EMBODIMENT | MONO-D | MONO-P |
|---|---|---|---|
| ∞ | 74.1 | 65.4 | 72.1 |
| 12.8 | 50.1 | 42.5 | 53.7 |
| 9.5 | 41.7 | 33.3 | 44.6 |
| 7.5 | 36.8 | 29.3 | 43.1 |
| 6.0 | 33.4 | 26.8 | 40.3 |
| 3.7 | 28.2 | 22.6 | 36.3 |
| 0.0 | 19.8 | 16.8 | 29.0 |
| -3.7 | 11.8 | 10.0 | 24.1 |

SOUND RECOGNITION APPARATUS, SOUND RECOGNITION METHOD, AND SOUND RECOGNITION PROGRAM

CROSS REFERENCE TO RELATED APPLICATIONS

Priority is claimed on Japanese Patent Application No. 2013-181521, filed on Sep. 2, 2013, the content of which is incorporated herein by reference.

BACKGROUND OF THE INVENTION

Field of the Invention

The present invention relates to a sound recognition apparatus, a sound recognition method, and a sound recognition program.

Description of Related Art

Sounds are classified into speech uttered by a person and other sounds. Such other sounds are called as usual sounds that do not have language information. Examples of such usual sounds include an operation sound generated by the operation of an instrument, environmental sounds such as noise generated by the contact of objects with each other, and musical sounds not accompanied by words. Such usual sounds are used as a key for the understanding of an object, an event, an operation state, and the like as a sound source. When speech uttered by a person is used as a sound source to identify an object, an event, and a state while ignoring language information expressed by the speech, the speech may be treated as a "usual sound".

For example, a monitoring system described in Japanese Unexamined Patent Application, First Publication No. 2008-241991 acquires a signal indicating an observed sound in which sounds emitted from multiple sound sources are mixed by observing surrounding sounds with multiple microphones. The monitoring system generates separated signals by sound sources, causes the separated signals to pass through a noise reducing circuit, and determines whether sounds expressed by the separated signals by sound sources are target environmental sounds by the use of a sound recognition circuit.

An image processing apparatus described in Japanese Unexamined Patent Application, First Publication No. 2011-250100 performs a blind sound source separating process on speech data, extracts sound data by sound sources, and generates direction data indicating directions of the sound sources. The image processing apparatus determines whether a sound of each sound source is an environmental sound other than speech uttered by a person, converts the environmental sound into a text, generates an effect image visually presenting the environmental sound based on the text-converted environmental sound, and overlays the effect image with a content image. The image processing apparatus includes an environmental sound identifying unit that converts an environmental sound into a text.

SUMMARY OF THE INVENTION

However, the environmental sound identifying unit of the image processing apparatus described in Japanese Unexamined Patent Application, First Publication No. 2011-250100 performs the same process as speech recognition process which is performed on speech uttered by a person. That is, the environmental sound identifying unit extracts a feature value from sound data and performs a matching process using an acoustic model indicating acoustic features for each unit such as a phoneme. On the other hand, a usual sound greatly varies in features (for example, frequency characteristics and temporal variations) depending on objects, events, operation states, and the like and cannot be described sufficiently using the acoustic features for each phoneme. Accordingly, it is difficult to recognize various usual sounds.

The invention is made in consideration of the above-mentioned circumstances and an object thereof is to provide a sound recognition apparatus, a sound recognition method, and a sound recognition program that can recognize various usual sounds.

(1) In order to achieve the above-mentioned object, according to an aspect of the invention, there is provided a sound recognition apparatus including: a sound feature value calculating unit which is configured to calculate a sound feature value based on a sound signal; a label converting unit which is configured to convert the sound feature value calculated by the sound feature value calculating unit into a corresponding label with reference to label data in which sound feature values and labels indicating sound units as constituent units of a sound are correlated; and a sound identifying unit which is configured to calculate a probability of each sound unit group sequence that a label sequence including labels converted by the label converting unit is segmented for each sound unit group with reference to segmentation data indicating a probability that a sound unit sequence including at least one sound unit will be segmented into at least one sound unit group and which is configured to identify a sound event corresponding to the sound unit group sequence selected based on the calculated probability with reference to sound event data indicating the sound unit group sequence for each sound event.

(2) Another aspect of the invention provides the sound recognition apparatus according to (1), wherein the label data indicates a correlation between a cluster, which is part of a vector space of the sound feature value, and the label and a variance of frequencies at which the sound unit appears in the sound unit group is greater than a predetermined variance.

(3) Another aspect of the invention provides the sound recognition apparatus according to (1) or (2), wherein the segmentation data is a probability model indicating an appearance probability of the sound unit group and an appearance probability of next sound unit group when at least one sound unit group is given.

(4) Another aspect of the invention provides the sound recognition apparatus according to any one of (1) to (3), wherein the sound identifying unit is configured to identify a sound event corresponding to a sound unit group sequence which is generated by interchanging the sound units corresponding to clusters between which a distance is smaller than a predetermined distance out of the sound units constituting the selected sound unit group sequence.

(5) According to still another aspect of the invention, there is provided a sound recognition method in a sound recognition apparatus, including: a sound feature value calculating step of calculating a sound feature value based on a sound signal; a label converting step of converting the calculated sound feature value into a corresponding label with reference to label data which is stored in a label data storage unit and in which sound feature values and labels indicating sound units as constituent units of a sound are correlated; and a sound identifying step of calculating a probability of each sound unit group sequence that a label sequence including the labels is segmented for each sound unit group with reference to segmentation data which is stored in a segmentation data storage unit and which indicates a probability that a sound unit sequence including at least one sound unit will be segmented into at least one sound unit group and identifying a sound event corresponding to the sound unit group sequence selected based on the calculated probability with reference to sound event data indicating the sound unit group sequence for each sound event which is stored in an event storage unit.

(6) According to still another aspect of the invention, there is provided a non-transitory computer-readable recording medium having a sound recognition program recorded thereto so as to cause a computer of a sound recognition apparatus to perform: a sound feature value calculating procedure of calculating a sound feature value based on a sound signal; a label converting procedure of converting the calculated sound feature value into a corresponding label with reference to label data which is stored in a label data storage unit and in which sound feature values and labels indicating sound units as constituent units of a sound are correlated; and a sound identifying procedure of calculating a probability of each sound unit group sequence that a label sequence including the labels is segmented for each sound unit group with reference to segmentation data which is stored in a segmentation data storage unit and which indicates a probability that a sound unit sequence including at least one sound unit will be segmented into at least one sound unit group and identifying a sound event corresponding to the sound unit group sequence selected based on the calculated probability with reference to sound event data indicating the sound unit group sequence for each sound event which is stored in an event storage unit.

According to the configurations of (1), (5), or (6), acoustic features of an input sound signal are expressed by a sound unit group sequence which is segmented into sound unit groups indicating a temporal variation thereof. The sound effect corresponding to the sound unit group sequence selected based on the calculated probability is identified. Accordingly, it is possible to recognize usual sounds having various acoustic features.

According to the configuration of (2), since the acoustic features of an input sound signal can be sufficiently expressed by sound units, it is possible to improve a recognition rate of a usual sound.

According to the configuration of (3), since the appearance probabilities of the sound unit group sequence obtained based on an input sound signal can be sequentially calculated, it is possible to reduce a processing load to achieve an increase in processing speed.

According to the configuration of (4), since the sound units having similar acoustic features are interchanged to generate candidates of the sound unit group sequence, it is possible to identify a desired sound event even when the acoustic features of an input sound signal vary depending on noise or the like.

BRIEF DESCRIPTION OF THE DRAWINGS

FIG. 2 is a diagram illustrating an example of label data.

FIG. 3 is a diagram illustrating an example of part of segmentation data.

FIG. 4 is a diagram illustrating an example of another part of segmentation data.

FIG. 21 is a diagram illustrating an example of an average frame correct answer rate.

FIG. 22 is a diagram illustrating another example of the average frame correct answer rate.

DETAILED DESCRIPTION OF THE INVENTION

First Embodiment

Hereinafter, a first embodiment of the invention will be described with reference to the accompanying drawings.

Figure 1:
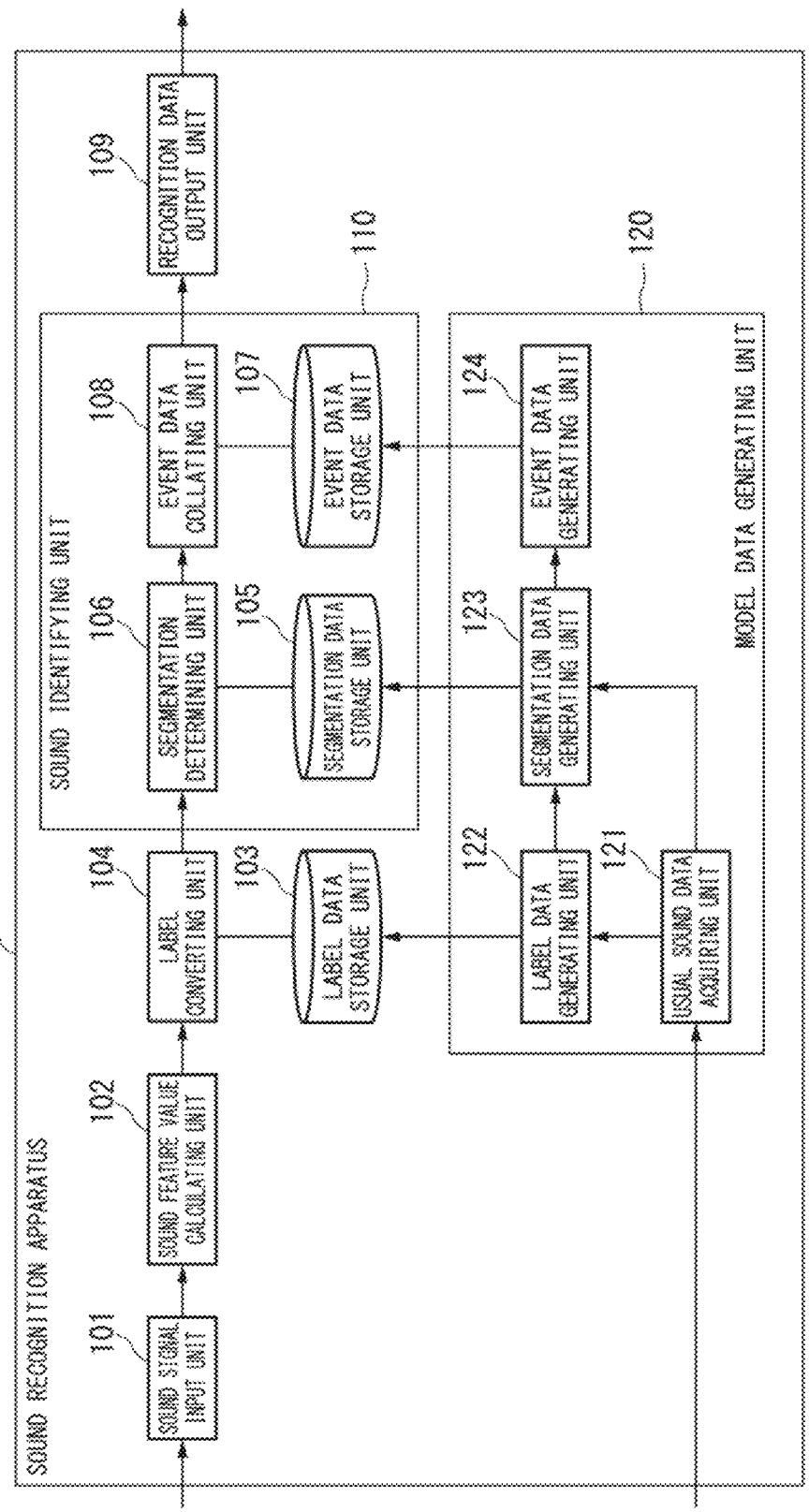
FIG. 1 is a block diagram illustrating a configuration of a sound recognition apparatus according to a first embodiment of the invention.

FIG. 1 is a block diagram illustrating a configuration of a sound recognition apparatus 1 according to the first embodiment of the invention.

The sound recognition apparatus 1 includes a sound signal input unit 101, a sound feature value calculating unit 102, a label data storage unit 103, a label converting unit 104, a recognition data output unit 109, a sound identifying unit 110, and a model data generating unit 120. The sound identifying unit 110 includes a segmentation data storage unit 105, a segmentation determining unit 106, an event data storage unit 107, and an event data collating unit 108.

The sound signal input unit 101 outputs a sound signal, which has been input from the outside of the sound recognition apparatus 1, to the sound feature value calculating unit 102. The sound signal input unit 101 is, for example, a data input interface.

The sound feature value calculating unit 102 calculates a sound feature value indicating a physical feature of the sound signal for each frame of a predetermined time (for example, 30 ms) based on the sound signal input from the sound signal input unit 101. The sound feature value calculated by the sound feature value calculating unit 102 is, for example, a 41-dimensional sound feature vector. This sound feature vector includes a 13-dimensional mel-scale logarithmic spectrum (MSLS), primary regression coefficients of the 13-dimensional MSLS, secondary regression coefficients of the 13-dimensional MSLS, a first-order difference of power, and a second-order difference of power thereof. The MSLS can be calculated by performing inverse discrete cosine transform on mel frequency cepstrum coefficients (MFCC). It is possible to obtain high noise resistance by using the sound feature vector including the MSLS or the regression coefficients thereof. The sound feature value calculating unit 102 outputs the calculated sound feature vector to the label converting unit 104.

Label data which is data in which labels and cluster centroids are correlated with each other are stored in advance in the label data storage unit 103. A label is identification data for identifying a sound unit as a basic unit of a sound. A sound unit is a unit corresponding to phonemes of speech uttered by a person. A cluster centroid is a centroid in a vector space of a sound feature vector and is a central point of an area belonging to a cluster of sound units. That is, the cluster centroid is a coefficient used for a sound feature vector to discriminate a cluster for each sound unit. Accordingly, the label data corresponds to an acoustic model used for speech recognition.

The label data may be data constituted by a probability model, for example, a Gaussian mixture model (GMM) and a hidden Markov model (HMM), which has been used for speech recognition in the related art. The GMM is a probability model in which an output probability of input data is expressed by weighting and adding multiple (for example, 16) normal distributions as a base. Accordingly, the GMM is defined by statistics such as a mixture weight, a mean, and a covariance matrix of each normal distribution. In this embodiment, sets of sound feature vectors and these statistics are correlated with labels indicating sound units to constitute label data.

The HMM is a probability model in which an output probability of input data is expressed by weighting and adding multiple normal distributions. The HMM is defined by statistics such as a mixture weight, a mean, a covariance matrix of each normal distribution, and a transition probability. In this embodiment, sets of input sound feature values and these statistics are correlated with labels indicating sound units to constitute label data.

In such probability models, statistics are determined by preliminary learning so as to give output probabilities of labels to the input sound feature vectors. In the preliminary learning, for example, the statistics may be determined so that the output probability of a sound unit relevant to a cluster is 1 when a sound feature vector is a cluster centroid of the cluster and the output probability of sound units relevant to the other clusters is 0.

The label converting unit 104 determines a cluster to which the sound feature vector input from the sound feature value calculating unit 102 belongs with reference to the label data stored in the label data storage unit 103, and identifies the label corresponding to the determined cluster. Here, when the label data is constituted by a probability model such as the GMM or the HMM, the label converting unit 104 calculates the output probability corresponding to the input sound feature vector with reference to the label data and identifies the label in which the calculated output probability is the highest.

Accordingly, the input sound feature vector is converted into a label. For example, the label converting unit 104 selects a cluster centroid of which the distance from the input sound feature vector is the smallest out of the cluster centroids indicated by the label data stored in the label data storage unit 103.

An index of the distance is, for example, an Euclidean distance. The Euclidean distance is also referred to as a squared Euclidean distance. The label converting unit 104 reads the label corresponding to the selected cluster centroid from the label data storage unit 103. The label converting unit 104 sequentially arranges the read labels $c_{dn}$ (where n is an integer indicating the order of the label) to form a label string $[c_d]$. Here, the sign [ . . . ] represents that . . . is a data sequence, a vector, or a matrix including multiple elements. The label converting unit 104 outputs the formed label string $[c_d]$ to the segmentation determining unit 106. That is, the output label string $[c_d]$ indicates a sound unit sequence including multiple sound units.

The label converting unit 104 may determine that the sound unit relevant to the sound feature value is a segmentation (to be described later) when it is determined that the input sound feature value is abnormal. The label converting unit 104 may determine that the sound feature value is abnormal, for example, when the power of the input sound signal is less than a predetermined power threshold value and the distance relevant to the selected cluster centroid is greater than a predetermined distance upper limit.

The segmentation data storage unit 105 is a storage unit in which segmentation data is stored in advance. The segmentation is a boundary between a sound unit group and a sound unit group subsequent thereto. The sound unit group is a sound unit sequence including one or more sound units.

The segmentation data is a statistical model including a sound unit N-gram model and a sound unit group N-gram model. This statistical model may be referred to as a sound unit/sound unit group N-gram model in the below description. The segmentation data, that is, the sound unit/sound unit group N-gram model, corresponds to a character/word N-gram model which is a kind of language model in a language process.

The segmentation data is a set of data including data which indicates a probability that a sound unit sequence including one or more sound units will be segmented into one or more sound unit groups as will be described below.

The sound unit N-gram model is data indicating the probability (N-gram) for each sound unit which will appear after one or more sound units in an arbitrary sound unit sequence. In the sound unit N-gram model, the segmentation may be treated as one sound unit. The sound unit N-gram model may indicate a statistical model including the probability thereof.

The sound unit group N-gram model is data indicating the probability (N-gram) for each sound unit group which will appear after one or more sound unit groups in an arbitrary sound unit group sequence. That is, the sound unit group N-gram model is a probability model indicating an appearance probability of a sound unit group and a subsequent sound unit group when a sound unit group sequence including at least one sound unit group is given.

The sound unit group N-gram model may indicate a statistical model including the probability thereof.

In the sound unit group N-gram model, the segmentation may be treated as one kind of sound unit group.

The sound unit N-gram model and the sound unit group N-gram model correspond to a character model and a word model in a language process, respectively.

The segmentation data may be data constituted by the probability model having been used for speech recognition in the related art, for example, the GMM and the HMM. In this embodiment, a set of one or more labels and statistics defining the probability model may be correlated with a label indicating a sound unit appearing subsequent thereto to form a sound unit N-gram model. A set of one or more sound unit groups and statistics defining the probability model may be correlated with a sound unit group appearing subsequent thereto to form a sound unit group N-gram model. The statistics defining the probability model include a mixture weight, a mean, and a covariance matrix of each normal distribution when the probability model is the GMM, and include a mixture weight, a mean, a covariance matrix of each normal distribution, and a transition probability when the probability model is the HMM.

In the sound unit N-gram model, the statistics are determined by preliminary learning so that an appearance probability of a label indicating a sound unit appearing subsequent thereto is given to one or more input labels. In the preliminary learning, a condition may be given so that the appearance probability of a label indicating another sound unit appearing subsequent thereto is 0. In the sound unit group N-gram model, the statistics are determined by preliminary learning so that an appearance probability of each sound unit group appearing subsequent thereto is given to one or more input sound unit groups. In the preliminary learning, a condition may be given so that the appearance probability of another sound unit group appearing subsequent thereto is 0.

The segmentation determining unit 106 determines a segmentation of a sound unit string, that is, a sound unit group sequence $[c_d']$ including a sound unit group $w_t$ (where t is an integer indicating the order of the sound unit group), with reference to the segmentation data stored in the segmentation data storage unit 105, where the sound unit string is indicated by a label string input from the label converting unit 104. That is, the sound unit group sequence $[c_d']$ is a data sequence in which a label sequence $[c_d]$ including labels $c_d$ corresponding to the sound units is segmented for each sound unit group $w_t$. The segmentation determining unit 106 calculates the appearance probability, that is, the recognition likelihood, for each candidate of the sound unit group sequences using the segmentation data stored in the segmentation data storage unit 105.

The segmentation determining unit 106 selects a candidate of the sound unit group sequence in which the calculated appearance probability is the highest as the sound unit group sequence $[c_d']$ which is the recognition result. The selected sound unit group sequence $[c_d']$ is a sound unit group sequence including a sound unit sequence forming each sound unit group and the segmentation between the sound unit groups. The candidates of the sound unit group sequence have the same sound unit string but are different from each other in segmentation of the sound units, that is, the collation or the order of the sound unit groups.

The segmentation determining unit 106 outputs the selected sound unit group sequence to the event data collating unit 108.

The segmentation determining unit 106 sequentially multiplies the appearance probabilities indicated by the N-gram for each sound unit group included in the candidates at the time of calculating the appearance probability of each candidate of the sound unit group sequence. The appearance probability of the N-gram of the sound unit group is a probability that the sound unit group appears when the sound unit group sequence immediately before the sound unit group is given. The appearance probability is given with reference to the above-mentioned sound unit group N-gram model. The appearance probability of each sound unit group can be calculated by sequentially multiplying the appearance probability of the head sound unit of the sound unit group by the appearance probability of the N-gram of the sound unit thereafter. The appearance probability of the N-gram of the sound unit is a probability that the sound unit appears when the sound unit sequence immediately before the sound unit is given. The appearance probability (unigram) of the head sound unit and the appearance probability of the N-gram of the sound unit are given with reference to the sound unit N-gram model.

The sound unit N-gram model constituting the segmentation data may be constituted by the probability model such as the GMM or the HMM as described above. In this case, the segmentation determining unit 106 calculates the appearance probability that a sound unit will appear subsequent to one or more input labels with reference to the sound unit N-gram model. The sound unit group N-gram model constituting the segmentation data may also be constituted by the probability model such as the GMM or the HMM. In this case, the segmentation determining unit 106 calculates the appearance probability that the sound unit group will appear subsequent to one or more input sound unit groups with reference to the sound unit group N-gram model.

The event data storage unit 107 is a storage unit in which event data is stored in advance. The event data is data in which an event and a sound unit group sequence relevant to the event are correlated. An event is an object generating a usual sound or an event or a sound thereof, that is, a sound event. Examples of the event include operations or sounds of various instruments an alarm sound of an alarm clock and a ringtone of a phone or human motions or sounds such as clapping. The event data storage unit 107 may store event data relevant to multiple events in advance.

The event data collating unit 108 receives an input of a sound unit group sequence from the segmentation determining unit 106 and collates the input sound unit group sequence with sound unit group sequences indicated by event data stored in the event data storage unit 107. Accordingly, the event data collating unit 108 identifies an event corresponding to the input sound unit group sequence.

The event data collating unit 108 generates recognition data indicating the event corresponding to the sound unit group sequence which is successfully collated and outputs the generated recognition data to the recognition data output unit 109.

Here, the event data collating unit 108 may determine that the collation with the event data in which a ratio (for example, the number of sound units or the number of sound unit groups) of a part matching the input sound unit group sequence out of the sound unit group sequence indicated by the event data is the greatest succeeds. The event data collating unit 108 may determine that the collation succeeds when the ratio is greater than a predetermined ratio (for example, 80%). When the collation fails, the event data collating unit 108 may output error data indicating that the sound could not be recognized as recognition data to the recognition data output unit 109.

The recognition data output unit 109 receives an input of the recognition data from the event data collating unit 108 and outputs the input recognition data to the outside of the sound recognition apparatus 1. The recognition data output unit 109 is, for example, a data output interface. The recognition data output unit 109 may be incorporated into the sound signal input unit 101 to constitute a data input/output interface.

The model data generating unit 120 generates model data, for example, label data and segmentation data, which is used in a usual sound recognizing process based on usual sound data including a sound signal of a usual sound. The model data generating unit 120 includes a usual sound data acquiring unit 121, a label data generating unit 122, a segmentation data generating unit 123, and an event data generating unit 124.

The usual sound data acquiring unit 121 acquires usual sound data used to generate the model data.

The usual sound data acquiring unit 121 may include, for example, a storage unit that receives an input of usual sound data (corpus) including an event and a sound signal indicating a usual sound relevant to the event from the outside of the sound recognition apparatus 1 and stores the input usual sound data.

The label data generating unit 122 reads the usual sound data from the usual sound data acquiring unit 121 and calculates a sound feature vector for each frame of a predetermined time for the sound signal included in the read usual sound data. The label data generating unit 122 clusters the calculated sound feature vector and calculates a cluster centroid for each cluster. The label data generating unit 122 generates a label for each cluster and correlates the generated label with the cluster centroid to generate label data. The label data generating unit 122 stores the generated label data in the label data storage unit 103 and outputs the generated label data to the segmentation data generating unit 123.

The segmentation data generating unit 123 reads the usual sound data from the usual sound data acquiring unit 121 and calculates a sound feature vector of a predetermined time for the sound signal included in the read usual sound data. The segmentation data generating unit 123 selects a cluster centroid closest to the cluster centroid indicated by the label data input from the label data generating unit 122 out of the calculated sound feature vectors. The segmentation data generating unit 123 specifies a label corresponding to the selected cluster centroid and generates a label string having the specified label as an element. The segmentation data generating unit 123 calculates the appearance probability of the N-gram of a sound unit based on the generated label string and calculates the appearance probability of the N-gram of a sound unit group based on the label string and the calculated appearance probability of the N-gram of the calculated sound unit. The segmentation data generating unit 123 generates a sound unit/sound unit group N-gram model indicating the calculated appearance probability of the N-gram of the sound unit and the appearance probability of the N-gram of the sound unit group as segmentation data. The segmentation data generating unit 123 stores the generated segmentation data in the segmentation data storage unit 105 and outputs the generated segmentation data to the event data generating unit 124. The segmentation data generating unit 123 outputs the generated label string and the read usual sound data to the event data generating unit 124.

The event data generating unit 124 calculates the appearance probability of each candidate of the sound unit group sequence with reference to the segmentation data input from the segmentation data generating unit 123 as for the sound unit string indicated by the label string input from the segmentation data generating unit 123. The event data generating unit 124 selects the candidate of the sound unit group sequence in which the calculated appearance probability is the highest. The event data generating unit 124 correlates the event indicated by the usual sound data input from the segmentation data generating unit 123 with the selected sound unit group sequence to generate event data and stores the generated event data in the event data storage unit 107.

The model data (mainly, the label data and the segmentation data) generating process which is performed by the model data generating unit 120 will be described later.

When the label data, the segmentation data, and the event data are stored in the label data storage unit 103, the segmentation data storage unit 105, and the event data storage unit 107, respectively, the model data generating unit 120 may be skipped. The model data generating process which is performed by the model data generating unit 120 may be performed by a device outside the sound recognition apparatus 1, for example, a computer.

Example of Label Data

An example of the label data will be described below.

FIG. 2 is a diagram illustrating an example of label data. The label data is data in which a label and a cluster centroid are correlated. For example, in the second row of FIG. 2, "$c_1$" as a label and "$[x_1]$" as a cluster centroid are correlated.

Example of Segmentation Data

An example of the segmentation data will be described below. The segmentation data is a sound unit/sound unit group N-gram model. That is, the segmentation data includes a sound unit N-gram model and a sound unit group N-gram model. The N-gram is a generic name of statistical models indicating the probability (unigram) that one element will appear and the probability that a subsequent element will appear when a sequence of N−1 (where N is a integer greater than 1) elements (for example, sound units) is given. The unigram is also referred to as a monogram. Particularly, when N=2 and 3, the N-gram is respectively referred to as a bigram and a trigram.

FIG. 3 is a diagram illustrating an example of part of the segmentation data.

The part of the segmentation data illustrated in FIG. 3 is a sound unit N-gram model. Parts (a), (b), and (c) of FIG. 3 illustrate examples of a sound unit unigram, a sound unit bigram, and a sound unit trigram, respectively.

Part (a) of FIG. 3 illustrates that a label indicating a sound unit and a sound unit unigram are correlated with each other. In the second row of Part (a) of FIG. 3, a label "$c_1$" and a sound unit unigram "$p(c_1)$" are correlated with each other. Here, $p(c_1)$ represents the appearance probability of the label "$c_1$". In the third row of Part (b) of FIG. 3, a label sequence "$c_1 c_2$" and a sound unit bigram "$p(c_1|c_2)$" are correlated with each other. Here, $p(c_1 c_2)$ represents the appearance probability of the sound unit $c_1$ when a sound unit $c_2$ is given. In the second row of Part (c) of FIG. 3, a label sequence "$c_1 c_1 c_1$" and a sound unit trigram "$p(c_1|c_1 c_1)$" are correlated with each other.

FIG. 4 is a diagram illustrating another example of part of the segmentation data.

The part of the segmentation data illustrated in FIG. 4 is a sound unit group N-gram model. Parts (a), (b), and (c) of FIG. 4 illustrate examples of a sound unit group unigram, a sound unit group bigram, and a sound unit group trigram, respectively.

Part (a) of FIG. 4 illustrates that a label indicating a sound unit group and a sound unit unigram are correlated with each other. In the second row of Part (a) of FIG. 4, a label "$w_1$" and a sound unit group unigram "$p(w_1)$" are correlated with each other. The label indicating a sound unit group represents a sound unit group including one or more sound units.

In the third row of Part (b) of FIG. 4, a label sequence "$w_1 w_2$" and a sound unit group bigram "$p(w_1|w_2)$" are correlated with each other. In the second row of Part (c) of FIG. 4, a label sequence "$w_1w_1w_1$" and a sound unit trigram "$p(w_1|w_1w_1)$" are correlated with each other.

Figures 5, 6:
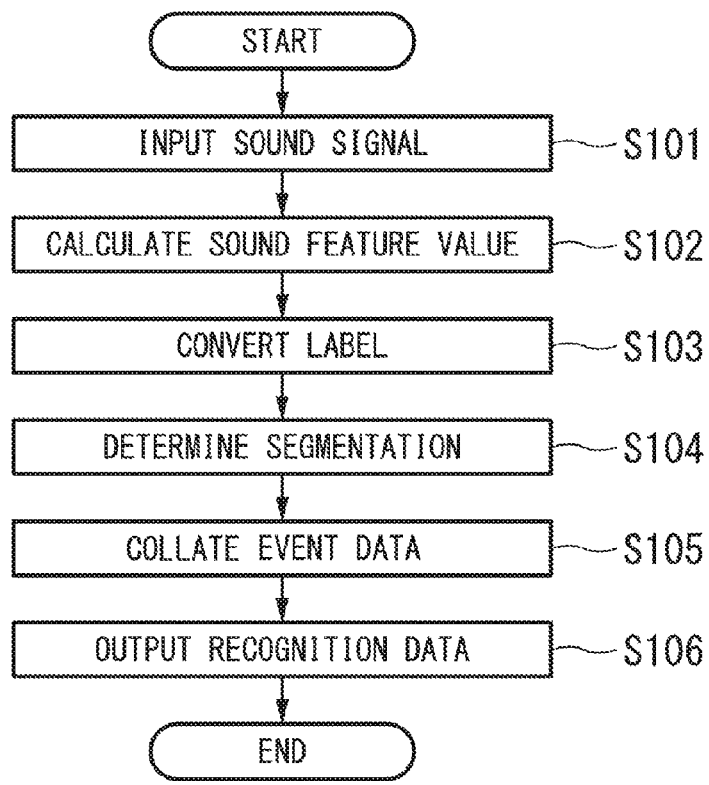
FIG. 5 is a diagram illustrating an example of event data.
FIG. 6 is a flowchart illustrating a sound recognition process according to the present embodiment.

In the example illustrated in FIG. 4, a label is given to each sound unit group, but a sound unit sequence constituting each sound unit group may be used instead (see FIG. 5). In this case, a segmentation symbol (for example, |) indicating segmentation may be inserted between the sound unit groups.

Example of Event Data

An example of the event data will be described below.

FIG. 5 is a diagram illustrating an example of event data.

The event data is data in which an event and a sound unit group sequence relevant to the event are correlated with each other. In the second row of FIG. 5, an event "$e_1$" and a sound unit group sequence "$c_1c_1|c_1c_1 \ldots$" are correlated with each other. In the sound unit group sequence "$c_1c_1|c_1c_1 \ldots$", the segmentation symbol "|" is inserted between the head "$c_1c_1$" and the subsequent "$c_1c_1 \ldots$". The segmentation symbol indicates the boundary of the sound unit group including the head "$c_1c_1$" and the sound unit group including the subsequent "$c_1c_1 \ldots$".

Sound Recognizing Process

A sound recognizing process according to this embodiment will be described below.

FIG. 6 is a flowchart illustrating the sound recognizing process according to this embodiment.

(Step S101) The sound signal input unit 101 receives an input of a sound signal from the outside of the sound recognition apparatus 1 and outputs the input sound signal to the sound feature value calculating unit 102. Thereafter, the process flow goes to step S102.

(Step S102) The sound feature value calculating unit 102 calculates a sound feature vector indicating the physical feature of the sound based on the sound signal input from the sound signal input unit 101. Then, the sound feature value calculating unit 102 outputs the calculated sound feature vector to the label converting unit 104. Thereafter, the process flow goes to step S103.

(Step S103) The label converting unit 104 determines a cluster to which the sound feature vector input from the sound feature value calculating unit 102 belongs with reference to the label data stored in the label data storage unit 103, and converts the sound feature vector into the label corresponding to the determined cluster. Then, the label converting unit 104 generates a label string including the converted label and outputs the generated label string to the segmentation determining unit 106. Thereafter, the process flow goes to step S104.

(Step S104) The segmentation determining unit 106 calculates the appearance probability of each candidate of the sound unit group sequence with reference to the segmentation data stored in the segmentation data storage unit 105 in the sound unit string indicated by the label string input from the label converting unit 104. Then, the segmentation determining unit 106 selects the candidate of the sound unit group sequence in which the calculated appearance probability is the highest (determines the segmentation). Then, the segmentation determining unit 106 outputs the selected candidate of the sound unit group sequence as a sound unit group sequence which is the recognition result to the event data collating unit 108. Thereafter, the process flow goes to step S105.

(Step S105) The event data collating unit 108 receives an input of a sound unit group sequence from the segmentation determining unit 106 and collates the input sound unit group sequence with the sound unit group sequences indicated by the event data stored in the event data storage unit 107. Then, the event data collating unit 108 generates recognition data indicating the event corresponding to the sound unit group sequence of which the collation succeeds and outputs the generated recognition data to the recognition data output unit 109. Thereafter, the process flow goes to step S106.

(Step S106) The recognition data output unit 109 outputs the recognition data input from the event data collating unit 108 to the outside of the sound recognition apparatus 1. Thereafter, the sound recognizing process illustrated in FIG. 6 ends.

Model Data Generating Process

The process of generating model data (model data generating process) which is performed by the model data generating unit 120 will be described below.

Figure 7:
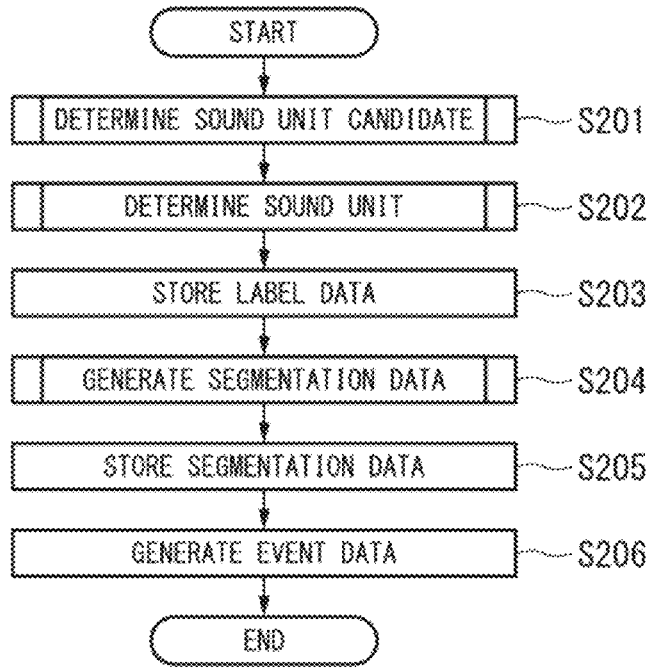
FIG. 7 is a flowchart illustrating an example of a model data generating process according to the present embodiment.

FIG. 7 is a flowchart illustrating an example of the model data generating process according to this embodiment.

(Step S201) The label data generating unit 122 determines candidates of a sound unit based on the usual sound data acquired from the usual sound data acquiring unit 121 (sound unit candidate determination). Thereafter, the process flow goes to step S202.

(Step S202) The label data generating unit 122 calculates a frequency distribution of the sound unit groups for each determined candidate of the sound unit and selects the candidate of the sound unit in which the calculated frequency distribution is most dispersed (sound unit determination). Thereafter, the process flow goes to step S203.

(Step S203) The label data generating unit 122 generates label data in which the label relevant to the selected candidate of the sound unit is correlated with the cluster centroid and stores the generated label data in the label data storage unit 103. Thereafter, the process flow goes to step S204.

(Step S204) The segmentation data generating unit 123 generates a label string for the usual sound data acquired from the usual sound data acquiring unit 121 based on the label data generated by the label data generating unit 122. Then, the segmentation data generating unit 123 generates a sound unit/sound unit group N-gram model for the generated label string as segmentation data (segmentation data generation). Thereafter, the process flow goes to step S205.

(Step S205) The segmentation data generating unit 123 stores the generated segmentation data in the segmentation data storage unit 105. Thereafter, the process flow goes to step S206.

(Step S206) The event data generating unit 124 calculates the appearance probability for each candidate of the sound unit group sequence with reference to the segmentation data generated by the segmentation data generating unit 123 in the sound unit string generated by the segmentation data generating unit 123. Then, the event data generating unit 124 selects the candidate of the sound unit group sequence in which the calculated appearance probability is the highest. Then, the event data generating unit 124 generate event data by correlating the event indicated by the usual sound data used for the segmentation data generating unit 123 to generate the sound unit string with the selected sound unit group sequence. Then, the event data generating unit 124 stores the generated event data in the event data storage unit 107. Thereafter, the process flow illustrated in FIG. 7 ends.

Sound Unit Candidate Determining Process

The sound unit candidate determining process which is performed in step S201 (FIG. 7) by the label data generating unit 122 will be described below. It is assumed that usual sound data includes a set of D (where D is an integer of 1 or greater) events and sound signals.

Figure 8:
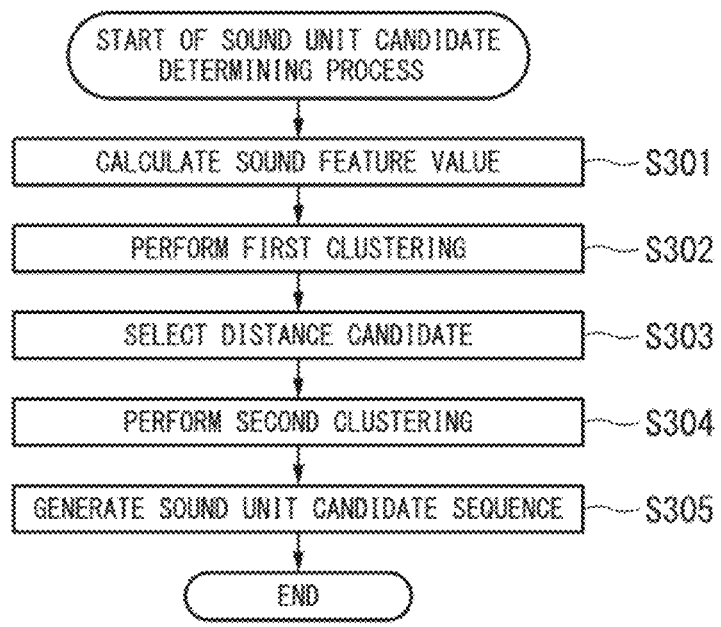
FIG. 8 is a flowchart illustrating a sound unit candidate determining process according to the present embodiment.

FIG. 8 is a flowchart illustrating the sound unit candidate determining process according to this embodiment.

(Step S301) The label data generating unit 122 calculates a sound feature vector for each frame of a predetermined time of the sound signal included in the usual sound data read from the usual sound data acquiring unit 121. Thereafter, the process flow goes to step S302.

(Step S302) The label data generating unit 122 clusters the sound feature vector calculated for each frame using a predetermined technique (for example, agglomerative hierarchical clustering). The cluster centroid for each cluster is calculated by this clustering. The clustering performed in this step is referred to as first clustering so as to be distinguished from the clustering performed in step S304. Thereafter, the process flow goes to step S303.

(Step S303) The label data generating unit 122 counts the number of distances between the calculated cluster centroids for each section of a predetermined distance and generates a histogram. Then, the label data generating unit 122 selects a representative value of the distances relevant to the section in which the counted number of distances between the cluster centroids in the generated histogram is a minimum as a distance candidate $D_1$. In the below description, the selected number of distance candidates $D_1$ is denoted by $N_1$. The number $N_1$ of distance candidates $D_1$ is typically two or more.

Thereafter, the process flow goes to step S304.

(Step S304) The label data generating unit 122 clusters the sound feature vectors calculated for each frame so that the error between the distances between cluster centroids and any of the selected distance candidates $D_1$ is a minimum. The clustering performed in this step is referred to as second clustering. The label data generating unit 122 performs the second clustering on each of the distance candidates $D_1$. Accordingly, the cluster centroid for each cluster is calculated for each distance candidate $D_1$. Then, the label data generating unit 122 correlates each distance candidate $D_1$ with the calculated cluster centroids and determines sound unit candidates. Thereafter, the process flow goes to step S305.

(Step S305) The label data generating unit 122 selects the cluster centroid of which the distance from the cluster centroids calculated for each distance candidate $D_1$ is the smallest in the sound feature vectors calculated for each frame, and determines the sound unit candidate corresponding to the selected cluster centroid. Here, the label data generating unit 122 generates a sound unit candidate sequence $[c_d]$ including the sound unit candidates determined for the event d (of which the maximum value is D) for each distance candidate $D_1$. The sound unit candidate sequence $[c_d]$ is expressed by $c_{d1}c_{d2} \ldots c_{dNd}$. The $c_{d1}$ or the like represents the first sound unit candidate of the event d. Thereafter, the process flow illustrated in FIG. 8 ends.

The agglomerative hierarchical clustering is a process of repeatedly performing a process of agglomerating the clusters relevant to the minimum distance $\Delta_{ij}$ out of the distances $\Delta_{ij}$ between the cluster centroid of a cluster i and the cluster centroid of another cluster j until reaching a predetermined number of clusters. Here, the label data generating unit 122 calculates the distance $\Delta_{ij}$, for example, using Expression (1).

$$\Delta_{ij} = \left\| \frac{1}{N_i} \sum_{n \in i} [x_n] - \frac{1}{N_j} \sum_{n \in j} [x_n] \right\| \quad (1)$$

In Expression (1), $N_i$ and $N_j$ represent the numbers of sound feature vectors belonging to the cluster i and the cluster j. The summation symbol $\Sigma$ and n∈i written below represent the total sum of the sound feature vectors $[x_n]$ belonging to the cluster i. Here, n is an index for distinguishing the respective sound feature vectors $[x_n]$ and is an integer of which the maximum value is the total number of frames N.

That is, the label data generating unit 122 calculates the distance $\Delta_{ij}$ between the cluster i and the cluster j using the Euclidean distance as a distance index.

Figure 9:
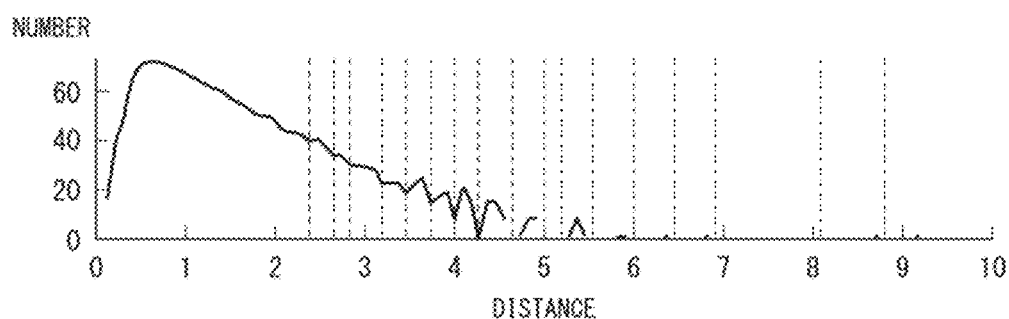
FIG. 9 is a diagram illustrating an example of a generated histogram.

FIG. 9 is a diagram illustrating an example of the generated histogram.

In FIG. 9, the horizontal axis represents the distance between the cluster centroids and the vertical axis represents the number of distances for each section. The dotted line indicates the distance at which the number is a minimum, that is, the distance candidate $D_1$. since the clustering is performed so that the distance between the cluster centroids are close to the distance candidate $D_1$ in step S304, the sound feature vectors are uniformly distributed between the clusters. That is, it can be seen that the acoustic features for each event can be sufficiently described by the sound unit candidates corresponding to the clusters. In the example illustrated in FIG. 9, the number $N_1$ of distance candidates $D_1$ is 17.

Sound Unit Determining Process

The sound unit determining process which is performed in step S202 (FIG. 7) by the label data generating unit 122 will be described below. The number of sound unit candidates may vary depending on the distance candidates $D_1$ and is denoted by M. The number of sound unit candidates may be a predetermined number.

Figure 10:
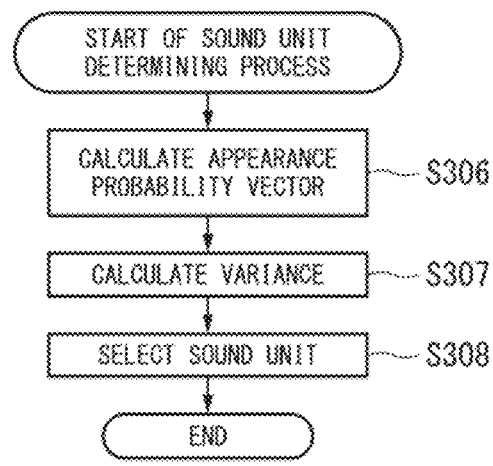
FIG. 10 is a flowchart illustrating a sound unit determining process according to the present embodiment.

FIG. 10 is a flowchart illustrating the sound unit determining process according to this embodiment.

(Step S306) The label data generating unit 122 calculates the appearance probability (unigram) $p(c_m|z_k)$ that a sound unit candidate $c_m$ appears in each sound unit group candidate $z_k$ based on the sound unit candidate sequence $[c_d]$ generated for each distance candidate $D_1$. Here, k represents an index for identifying a sound unit group candidate and the maximum value of k is $N_z$. In addition, m represents an index for identifying a sound unit candidate and the maximum value of m is M.

Then, the label data generating unit 122 generates a column vector $[\beta_m]$ having the calculated appearance probabilities as elements of each row for each sound unit candidate m. In the below description, the column vector $[\beta_m]$ is referred to as an appearance probability vector. The label data generating unit 122 uses, for example, a latent Dirichlet allocation (LDA) method to calculate the appearance probability $p(c_m|z_k)$. As will be described later, the label data generating unit 122 generates the sound unit group candidate $z_k$ in the course of performing the LDA method. Thereafter, the process flow goes to step S307.

(Step S307) The label data generating unit 122 calculates a variance $\sigma_1$ of the appearance probability vector $[\beta_m]$ calculated among the sound units m for each distance candidate $D_1$. Thereafter, the process flow goes to step S308.

(Step S308) The label data generating unit 122 selects the distance candidate $D_1$ in which the calculated variance $\sigma_1$ is greater than a predetermined distance threshold value, for example, a distance candidate $D_1$ in which the variance $\sigma_1$ is a maximum.

Then, the label data generating unit 122 selects candidates of the sound unit for the selected distance candidate $D_1$. Thereafter, the process flow illustrated in FIG. 10 ends.

Accordingly, since the distances between the cluster centroids are selected so that the appearance probability of each sound unit group is dispersed to the maximum depending on the sound units, the sound unit group with which various sound unit groups can be satisfactorily expressed is selected.

Figure 11:
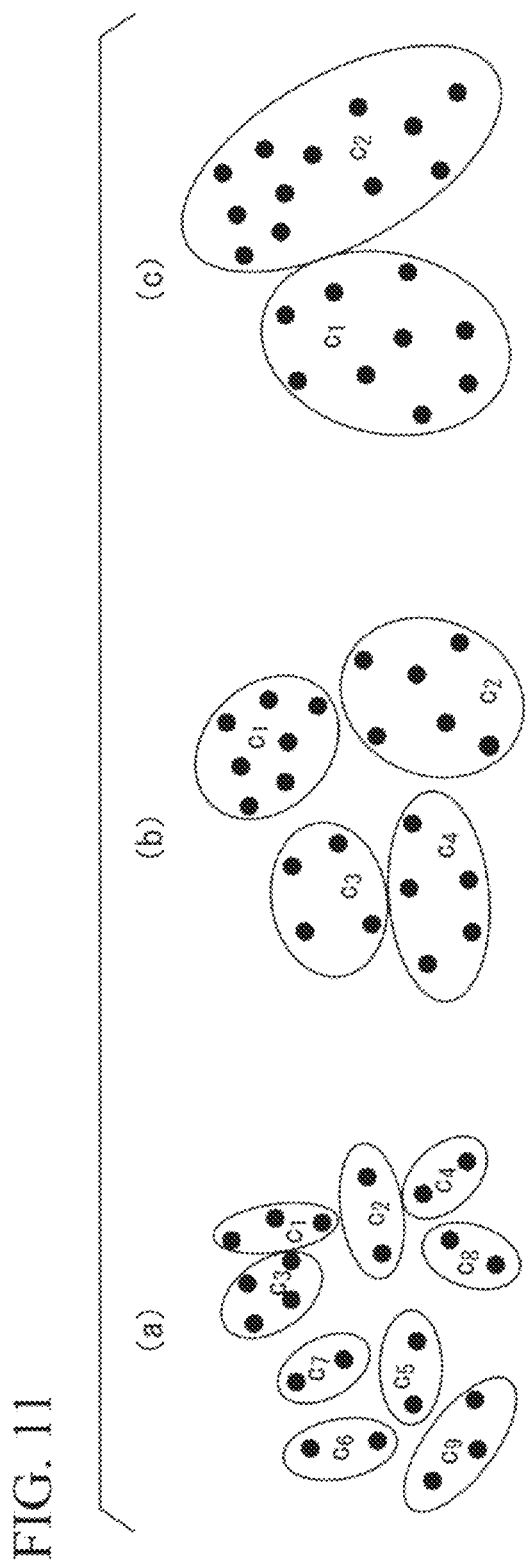
FIG. 11 is a diagram illustrating an example of a cluster of a sound feature vector.

FIG. 11 is a diagram illustrating an example of clusters of sound feature vectors.

Parts (a), (b), and (c) of FIG. 11 illustrate clusters relevant to different distance candidates $D_1$ using ellipses. The symbol of $c_1$ or the like is a symbol for identifying each cluster. Black circles surrounded with the ellipses represent the sound feature vectors. In this example, the values of the distance candidates $D_1$ ascend in the order of parts (a), (b), and (c) of FIG. 11. That is, in part (a) of FIG. 11, the clusters are the smallest and features of a sound signal are expressed by a largest number of sound units. Accordingly, the clusters are likely to be affected by the variation of the sound feature value due to noise or the like and thus the noise resistance is low. In part (c) of FIG. 11, the clusters are the largest and features of a sound signal are expressed by a smallest number of sound units. Accordingly, the clusters are unlikely to be affected by the variation of the sound feature value due to noise or the like but features of the sound signal cannot be satisfactorily expressed by the sound units corresponding to the clusters.

Figure 12:
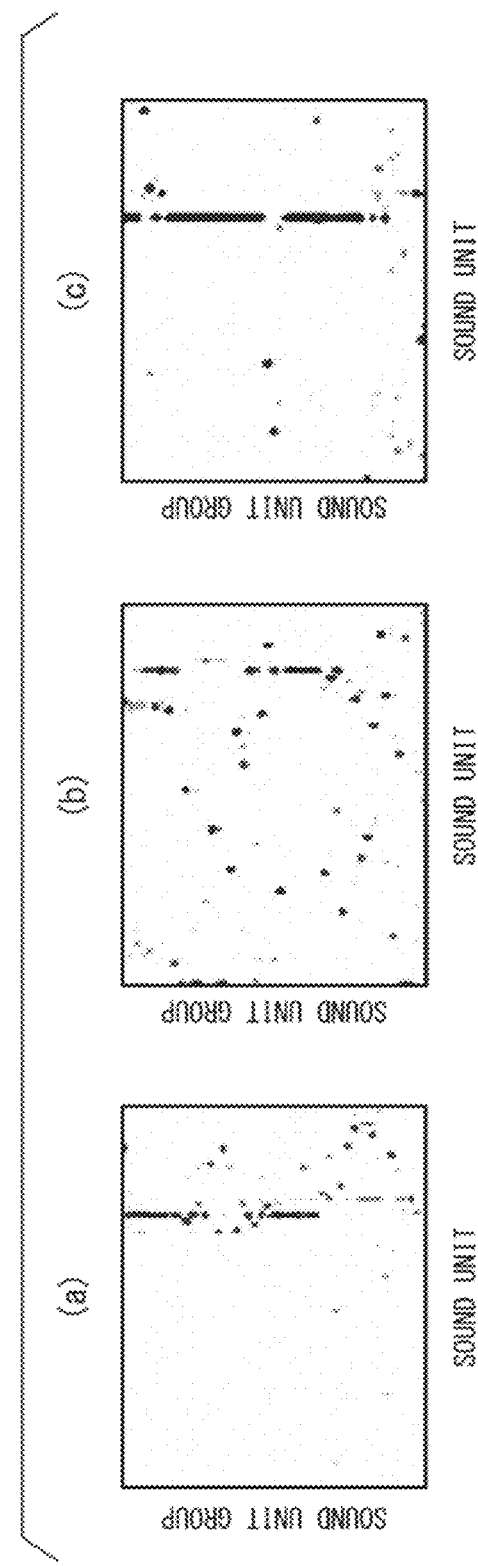
FIG. 12 is a diagram illustrating an example of an appearance probability.

FIG. 12 is a diagram illustrating examples of the appearance probability.

In FIG. 12, the horizontal axis represents the sound unit and the vertical axis represents the sound unit group.

In parts (a), (b), and (c) of FIG. 12, the appearance probabilities obtained based on the clusters of parts (a), (b), and (c) of FIG. 11 are expressed with gray scales. A darker part has a higher appearance probability and a lighter part has a lower appearance probability.

In the examples illustrated in parts (a) and (c) of FIG. 12, parts having a high appearance probability of each sound unit group with respect to a specific sound unit tend to be expressed by a vertical linear shape. On the contrary, in the example illustrated in part (b) of FIG. 12, spot-like parts having a high appearance probability of each sound unit group with respect to a specific sound unit are dispersed more than in the example illustrated in parts (a) and (c) of FIG. 12. That is, since the distance between the cluster centroids is selected so that the appearance probabilities of the sound unit groups are dispersed depending on the sound units, the acoustic feature can be satisfactorily expressed with a small number of sound unit sequences including the corresponding sound units.

The LDA method will be described below.

The LDA method employs a statistical model indicating a document in a corpus using $N_z$ latent topics in the related art and has been used mainly for a language process. In this embodiment, an event, a sound unit group, and sound units are used instead of the document, the latent topic, and words in the language process.

Figure 13:
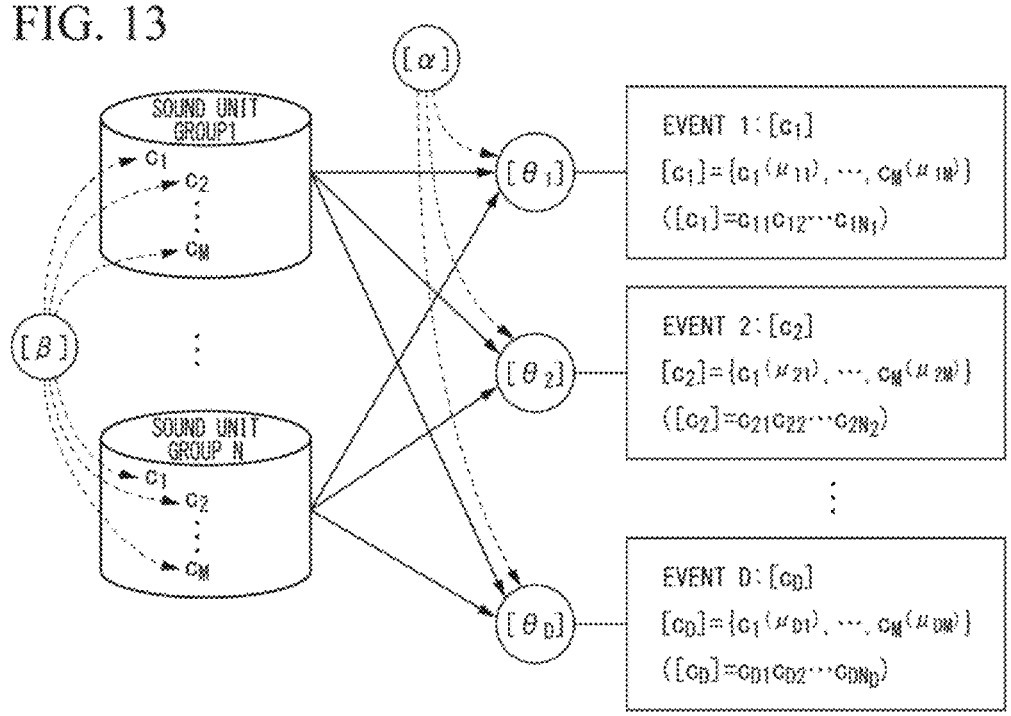
FIG. 13 is a conceptual diagram illustrating an LDA method.

FIG. 13 is a conceptual diagram of the LDA method.

As illustrated in FIG. 13, in the LDA method, it is assumed that D events $[c_1], [c_2], \ldots, [c_D]$ are treated and the d-th event $[c_d]$ is a sound unit sequence including $N_d$ sound units ($[c_d]=c_{D1}c_{D2}\ldots c_{DNd}$). The d-th event $[c_d]$ is expressed by $\{c_1^{(\mu_{d1})}, \ldots, c_M^{(\mu_{dM})}\}$. Here, $\mu_{dm}$ represents the number of sound units $c_m$ appearing in the d-th event. That is, the d-th event $[c_d]$ is a sound unit sequence including $\mu_{dm}$ sound units $c_m$ and the total sum of m in $\mu_{dm}$ is $N_d$.

In the LDA method, it is assumed that the probability $([\theta_d]=[\theta_1, \theta_2, \ldots, \theta_{Nz}])$ that a sound unit group $([z]=[z_1, z_2, \ldots, z_{Nz}])$ will be formed in the d-th event depends on a Dirichlet distribution $\mathrm{Dir}([\theta_d]|[\alpha])$. In the below description, $[\theta_d]$ is referred to as a formation probability vector.

Here, $[\alpha]$ represents the occurrence frequency vector. The occurrence frequency vector $[\alpha]$ is a vector having the occurrence frequency $\alpha_k$ (where k is an integer from 1 to $N_z$) of the sound unit group $z_k$ as an element. The Dirichlet distribution $([\theta_d]|[\alpha])$ is a probability distribution in which the probability that the sound unit group $z_k$ appears is $\theta_k$ is given when $(\alpha_k-1)\times m$ sound units $c_m$ are included. The sound unit group $z_k$ is a sound unit sequence including one or more sound units, and the label data generating unit 122 employs the sound unit group $z_k$ having the highest to $N_z$-th highest appearance probabilities.

In this case, the probability of forming a corpus [W] including D events $[c_1], [c_2], \ldots, [c_D]$ is expressed by Expression (2).

$$P([W] \mid [\alpha], [\beta]) = \prod_{d=1}^{D} p([\theta_d] \mid [\alpha]) \left( \prod_{n=1}^{N_d} \sum_{k=1}^{N_z} p(z_{dk} \mid [\theta_d]) p(c_{dn} \mid z_{dk}, [\beta]) \right) d[\theta_d] \quad (2)$$

In Expression (2), $[\beta]$ represents an appearance probability matrix having an appearance probability vector $[\beta_m]$ in each column. $p(z_{dk}|[\theta_d])$ represents the probability that the sound unit group $z_{dk}$ appears in the event d when the formation probability vector $[\theta_d]$ is given. In this embodiment, $p(z_{dk}|[\theta_d])$ may be assumed to be a multinomial distribution based on the formation probability vector $[\theta_d]$.

$p(c_{dn}|z_{dk}, [\beta])$ represents the probability that the sound unit $c_{dn}$ appears in the n-th frame of the event d when the sound unit group $z_{dk}$ and the appearance probability matrix $[\beta]$ are given. The label data generating unit 122 calculates the occurrence frequency vector $[\alpha]$ and the appearance probability matrix $[\beta]$ satisfying Expression (2) based on the sound unit candidate sequence $[c_d]$ generated for each distance candidate $D_1$.

Figure 14:
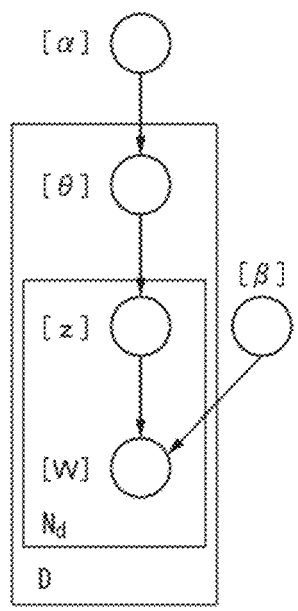
FIG. 14 is a diagram illustrating a graphical model in the LDA method.

FIG. 14 illustrates a graphical model of the LDA method.

An arrow directed from [z] to [W] and an arrow directed from $[\beta]$ to [W] represent that the formation probability of the corpus [W] is given by a set of sound unit groups $z_{dk}$ [z] and the appearance probability matrix $[\beta]$. A rectangle surrounding [z] and [W] and $N_d$ described at the lower-left end in the rectangle represent that the set of sound unit groups $z_{dk}$ [z] and the appearance probability matrix $[\beta]$ for each event d are given from the $N_d$ sound units $c_d$. An arrow directed from $[\theta]$ to [z] represents that the probability of the sound unit group $z_{dk}$ is given to the formation probability vector $[\theta]$. A rectangle surrounding $[\theta]$ and D described at the lower-left end therein represent that the probability $[\theta]$ is given for every D events d. An arrow directed from $[\alpha]$ to $[\theta]$ represents that the formation probability vector $[\theta_d]$ is given by the occurrence frequency vector $[\alpha]$.

The location of the occurrence frequency vector $[\alpha]$ and the appearance probability matrix $[\beta]$ outside the rectangle means that they are estimated as unknowns.

Processing of Segmentation Data Generating Unit

The process performed by the segmentation data generating unit 123 will be described below.

The segmentation data generating unit 123 (see FIG. 1) generates a sound unit sequence based on the usual sound data read from the usual sound data acquiring unit 121 using the label data generated by the label data generating unit 122. The segmentation data generating unit 123 generates segmentation data using a predetermined method, for example, Nested Pitman-Yor (NPY) process, based on the generated sound unit sequence. The NPY process is a technique which has been used for morphological analysis of a natural language in the related art.

In this embodiment, sound unit groups and sound units instead of words and characters in the morphological analysis are used in the NPY process. That is, the NPY process is performed to generate a statistical model with a nested structure in which statistical characteristics of the sound unit sequences are nested by the sound unit group N-gram and the sound unit N-gram. The statistical model generated through the NPY process is referred to as an NPY model. The segmentation data generating unit 123 uses, for example, a hierarchical Pitman-Yor (HPY) process to generate the sound unit group N-gram and the sound unit N-gram. The HPY process is a probability process obtained by hierarchically extending the Dirichlet process.

When the sound unit group N-gram is generated using the HPY process, the segmentation data generating unit 123 calculates an occurrence probability p(w|[h]) of a subsequent sound unit group w in a sound unit group sequence [h] based on the occurrence probability p(w|[h']) of the subsequent sound unit group w in the sound unit group sequence [h']. The segmentation data generating unit 123 uses, for example, Expression (3) to calculate the occurrence probability p(w|[h]). Here, the sound unit group sequence [h'] is a sound unit group sequence $w_{t-n-1} \ldots w_{t-1}$ including latest n-1 sound unit groups. Here, t represents an index for identifying a current sound unit group. The sound unit group sequence [h] is a sound unit group sequence $w_{t-n} \ldots w_{t-1}$ including n sound unit groups to which the latest sound unit group $w_{t-n}$ is added to the sound unit group sequence [h'].

$$p(w \mid [h]) = \frac{\gamma(w \mid [h]) - \eta t_{hw}}{\xi + \gamma([h])} + \frac{\xi + \eta t_h}{\xi + \gamma([h])} p(w \mid [h']) \quad (3)$$

In Expression (3), γ(w|[h]) represents a frequency (N-gram count) in which the sound unit group w occurs when the sound unit group sequence [h] is given. γ([h]) is the total sum $\Sigma_w \gamma(w|[h])$ of the frequency γ(w|[h]) among the sound unit groups w. In addition, $t_{hw}$ represents the frequency ((N−1)-gram count) in which the sound unit group w occurs when the sound unit group sequence [h'] is given, and $t_h$ represents the total sum $\Sigma_w t_{hw}$ of $t_{hw}$ among the sound unit groups w. ξ represents a strength parameter. The strength parameter ξ is a parameter for controlling a degree of closeness of the probability distribution including the occurrence probability p(w|[h]) to be calculated to a base measure. The base measure is a prior probability of a sound unit group or a sound unit. η represents a discount parameter. The discount parameter η is a parameter for controlling a degree of reduction of the influence of the occurrence frequency of the sound unit group w when the sound unit group sequence [h] is given. The segmentation data generating unit 123 may perform, for example, Gibbs sampling using a predetermined candidate value when determining the parameters ξ and η.

The segmentation data generating unit 123 calculates a one-degree-higher order of occurrence probability p(w|[h]) using a certain order of occurrence probability p(w|[h']) as the base measure as described above. However, when the boundary between the sound unit groups, that is, information on the segmentation, is not given, the base measure cannot be obtained.

Accordingly, the segmentation data generating unit 123 generates a sound unit N-gram using the HPY process and uses the generated sound unit N-gram as the base measure of the sound unit group N-gram.

The segmentation data generating unit 123 calculates the occurrence probability p(c|[c]) of a subsequent sound unit c in a sound unit sequence [c] based on the occurrence probability p(c|[c']) of the subsequent sound unit c in the given sound unit sequence [c'] at the time of generating the sound unit N-gram. The segmentation data generating unit 123 uses, for example, Expression (4) to calculate the occurrence probability p(c|[c]).

Here, the sound unit sequence [c'] is a sound unit sequence $c_{t-n-1} \ldots c_{t-1}$ including n-1 latest sound units. Here, t represents an index for identifying a current sound unit. The sound unit sequence [c] is a sound unit sequence $c_{t-n} \ldots c_{t-1}$ including n sound units to which the latest sound unit $c_{t-n}$ is added to the sound unit sequence [c'].

$$p(c \mid [c]) = \frac{\delta(c \mid [c]) - s_{[c]c}}{\theta + \delta([c])} + \frac{\theta + s_c}{\theta + \delta([c])} p(c \mid [c']) \quad (4)$$

In Expression (4), (c|[c]) represents the frequency (N-gram count) in which the sound unit c occurs when the sound unit sequence [c] is given. δ([c]) is the total sum $\Sigma_c \delta(c|[c])$ of the frequency δ(c|[c]) among the sound units c. $s_{[c]c}$ represents the frequency ((N−1)-gram count) in which the sound unit c occurs when the sound unit sequence [c'] is given. $s_c$ is the total sum $\Sigma_c s_{[c]c}$ of $s_{[c]c}$ among the sound units c. θ and s represent the strength parameter and the discount parameter, respectively. The segmentation data generating unit 123 may determine the strength parameter θ and the discount parameter s by performing the Gibbs sampling as described above.

In the segmentation data generating unit 123, the order of the sound unit N-gram and the order of the sound unit group N-gram may be set in advance. The order of the sound unit N-gram and the order of the sound unit group N-gram are, for example, 10-th order and third-order, respectively.

Figure 15:
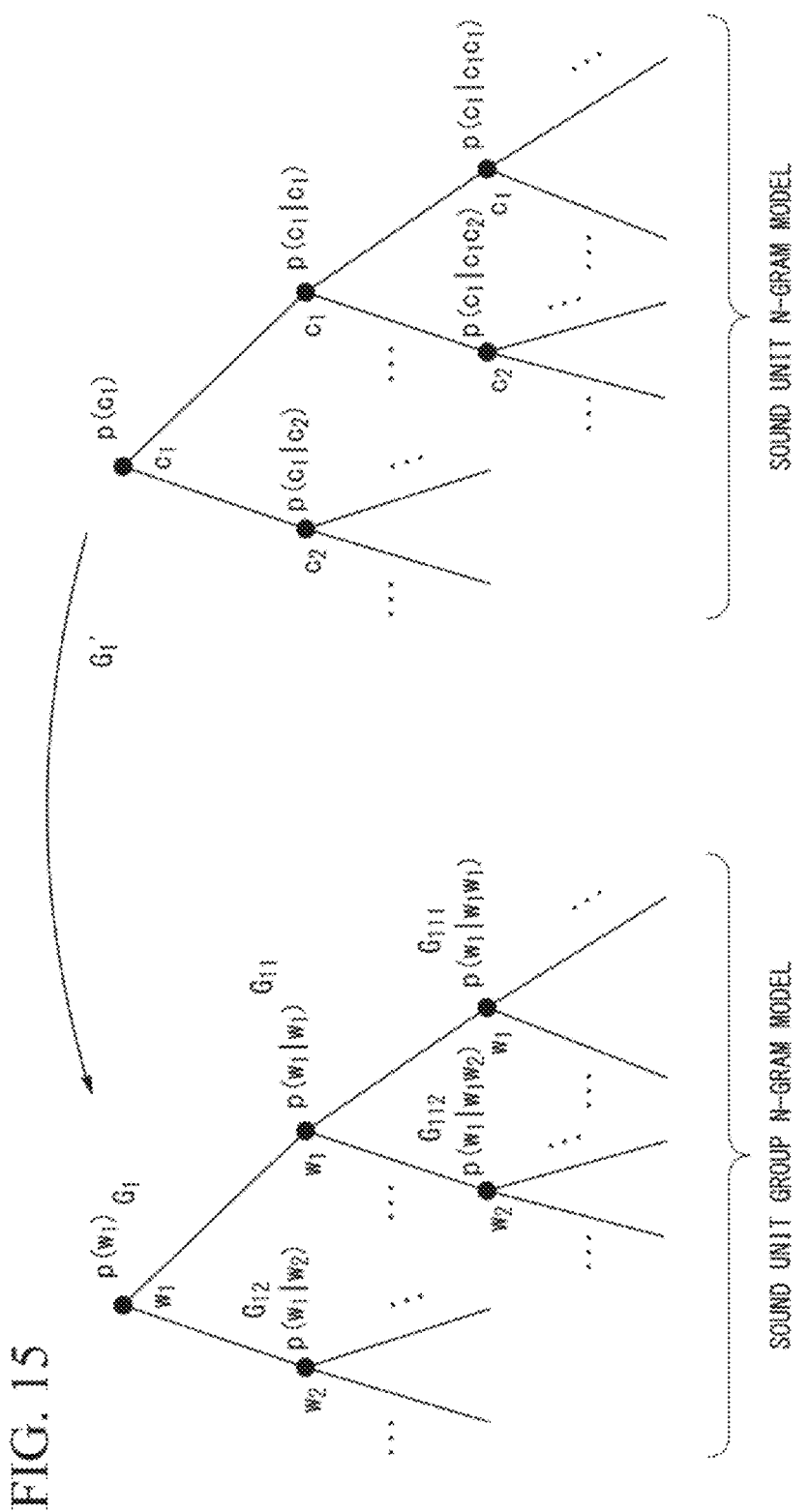
FIG. 15 is a diagram illustrating an example of an NPY model generated in an NPY process.

FIG. 15 is a diagram illustrating an example of an NPY model generated in the NPY process.

The NPY model illustrated in FIG. 15 is a sound unit group/sound unit N-gram model including a sound unit group N-gram model and a sound unit N-gram model. The segmentation data generating unit 123 calculates bigrams $p(c_1|c_1)$ and $p(c_1|c_2)$ based on a unigram $p(c_1)$ indicating the appearance probability of the sound unit $c_1$ at the time of generating the sound unit N-gram model. The segmentation data generating unit 123 calculates trigrams $p(c_1|c_1c_1)$ and $p(c_1|c_1c_2)$ based on the bigram $p(c_1|c_1)$.

The segmentation data generating unit 123 calculates a sound unit group unigram included in the sound unit group N-gram using the calculated sound unit N-gram, that is, the unigram, the bigram, the trigram, and the like thereof, as the base measure $G_1'$. For example, the unigram $p(c_1)$ is used to calculate a unigram $p(w_1)$ indicating the appearance probability of the sound unit group $w_1$ including the sound unit $c_1$. The segmentation data generating unit 123 uses the unigram $p(c_1)$ and the bigram $p(c_1|c_2)$ to calculate a unigram $p(w_2)$ of the sound unit group $w_2$ including the sound unit sequence $c_1c_2$. The segmentation data generating unit 123 uses the unigram $p(c_1)$, the bigram $p(c_1|c_1)$, and the trigram $p(c_1|c_1c_2)$ to calculate a unigram $p(w_3)$ of a sound unit group $w_3$ including the sound unit sequence $c_1c_1c_2$.

The segmentation data generating unit 123 calculates bigrams $p(w_1|w_1)$ and $p(w_1|w_2)$, for example, using the unigram $p(w_1)$ indicating the appearance probability of the sound unit group $w_1$ as a base measure $G_1$ at the time of generating the sound unit group N-gram model. The segmentation data generating unit 123 calculates trigrams $p(w_1|w_1w_1)$ and $p(w_1|w_1w_2)$ using the bigram $p(w_1|w_1)$ as a base measure $G_{11}$.

In this way, the segmentation data generating unit 123 sequentially calculates a higher-order sound unit group N-gram based on the selected sound unit group sequence and a certain order of sound unit group N-gram. However, when the number of types (branch number) of sound unit groups subsequent to a certain order of sound unit group is great, the statistical model is complicated and the processing load becomes vast.

Accordingly, the segmentation data generating unit 123 may generate segmentation data for each candidate of a predetermined number of sound unit groups $N_z$ and may calculate an index indicating a degree of complexity, for example, perplexity, of a model based on the generated segmentation data. The perplexity is specifically an index indicating the average branch number of the sound unit groups. The segmentation data generating unit 123 selects a candidate of the number of sound unit groups $N_z$ of which the calculated index is smaller than a predetermined index value and the segmentation data corresponding to the candidate as a learning result. Particularly, when the number of sound unit groups $N_z$ is two or more, the segmentation data generating unit 123 may select a candidate of the number of sound unit groups $N_z$ of which the calculated index is the smallest and the segmentation data corresponding to the candidate as the learning result.

At the time of calculating the perplexity as the index indicating the degree of complexity of a model, the segmentation data generating unit 123 calculates the appearance probability for each sound unit group from the sound unit group sequence obtained based on the usual sound data. The segmentation data generating unit 123 calculates an entropy H per one sound unit group based on the calculated appearance probability and calculates a value $2^H$, which is obtained by raising 2 to the H-th power, as the perplexity. Accordingly, it is possible to avoid an excessive increase in the processing load at the time identifying the event of a usual sound. The event is expressed by segments having the smallest sound unit sequence, that is, the smallest sound unit groups (number of segments).

Segmentation Data Generating Process

The segmentation data generating process which is performed in step S204 (FIG. 7) by the segmentation data generating unit 123 will be described below.

Figure 16:
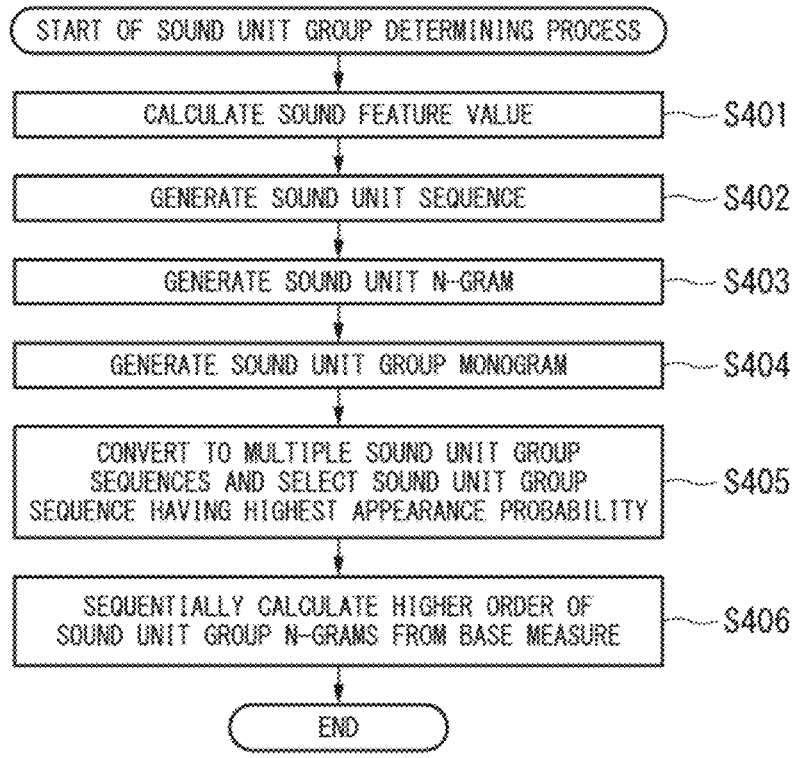
FIG. 16 is a flowchart illustrating a segmentation data generating process according to the present embodiment.

FIG. 16 is a flowchart illustrating the segmentation data generating process according to this embodiment.

(Step S401) The segmentation data generating unit 123 reads a usual sound data from the usual sound data acquiring unit 121 and calculates a sound feature vector of a predetermined time of the sound signal included in the read usual sound data. Thereafter, the process flow goes to step S402.

(Step S402) The segmentation data generating unit 123 selects a cluster centroid closest to the cluster centroid indicated by the label data generated by the label data generating unit 122 out of the calculated sound feature vectors. Then, the segmentation data generating unit 123 specifies a label corresponding to the selected cluster centroid and generates a label string, that is, a sound unit sequence, having the specified label as an element. Thereafter, the process flow goes to step S403.

(Step S403) The segmentation data generating unit 123 generates a sound unit N-gram based on the generated sound unit sequence. Thereafter, the process flow goes to step S404.

(Step S404) The segmentation data generating unit 123 generates a unigram of a sound unit group using the generated sound unit N-gram as a base measure. Thereafter, the process flow goes to step S405.

(Step S405) The segmentation data generating unit 123 generates a conversion table in which one or more sound units, sound unit groups, and unigrams for each element of the generated sound unit N-gram are correlated with each other. Then, the segmentation data generating unit 123 converts the generated sound unit sequence into multiple branches of sound unit group sequences using the generated conversion table and selects the sound unit group sequence in which the appearance probability is the highest out of the multiple converted branches of sound unit group sequences. Thereafter, the process flow goes to step S406.

(Step S406) The segmentation data generating unit 123 sequentially calculates higher-order sound unit group N-grams based on the selected sound unit group sequence using a certain-order sound unit group N-gram as a base measure. Thereafter, the process flow illustrated in FIG. 16 ends.

Modification Example of Model Data Generating Process

The model data generating unit 120 may perform a model data generating process according to a modification example to be described below. The same configuration and process as in the above-mentioned embodiment will be referenced by the same reference signs and description thereof will be invoked.

Figure 17:
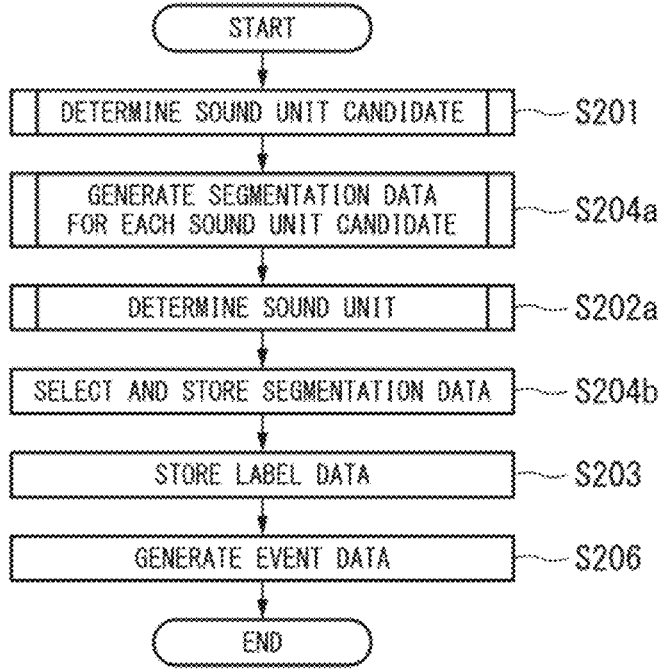
FIG. 17 is a flowchart illustrating a modification example of the model data generating process according to the present embodiment.

FIG. 17 is a flowchart illustrating a modification example of the model data generating process according to this embodiment.

This modification example includes steps S201, S203, and S206 (see FIG. 7) and also includes steps S202a, S204a, and S204b. In this modification example, the process flow goes to step S204a after step S201 ends.

(Step S204a) The segmentation data generating unit 123 generates segmentation data relevant to a sound unit group candidate, that is, a sound unit group candidate/sound unit candidate N-gram, based on the sound unit candidate sequence generated for each distance candidate by the label data generating unit 122. Here, the segmentation data generating unit 123 performs the processes of steps S403 to S406 (see FIG. 16) on the sound unit candidate sequence generated for each distance candidate instead of the sound unit sequence. Thereafter, the process flow goes to step S202a.

(Step S202a) The label data generating unit 122 calculates an appearance probability $p(c_m|z_k)$ based on the segmentation data generated for each distance candidate by the segmentation data generating unit 123. Here, the label data generating unit 122 can calculate the appearance probability $p(c_m|z_k)$ by dividing the appearance probability of the sound unit candidate $c_m$ out of one or more sound unit candidates constituting the sound unit group candidate $z_k$ indicated by the segmentation data by the appearance probability of the sound unit group candidate $z_k$. Then, the label data generating unit 122 calculates an appearance probability vector $[\beta_m]$ having the calculated appearance probabilities as elements of each row for each sound unit candidate m. Thereafter, the label data generating unit 122 calculates a variance $\sigma_1$ of $[\beta_m]$ calculated for each distance candidate. Then, the label data generating unit 122 selects the distance candidate $D_1$ in which the calculated variance $\sigma_1$ is the maximum. The label data generating unit 122 selects the sound unit candidate relevant to the selected distance candidate $D_1$. Thereafter, the process flow goes to step S204b.

(Step S204b) The segmentation data generating unit 123 selects the segmentation data relevant to the distance candidate $D_1$ selected by the label data generating unit 122 out of the generated segmentation data and stores the selected segmentation data in the segmentation data storage unit 105. Thereafter, the process flow goes to step S203.

After step S203 ends, the process flow goes to step S206. Thereafter, the process flow illustrated in FIG. 17 ends.

In step S202a, the label data generating unit 122 may calculate the appearance probability vector $[\beta_m]$ for each sound unit candidate m using the LDA method based on the sound unit candidate sequence generated for each distance candidate. At the time of using the LDA method, the sound unit candidate designated by the segmentation data generated by the segmentation data generating unit 123 may be used.

In this way, the sound unit candidates and the frequency of each sound unit candidate are calculated based on the label data and the segmentation data generated for each distance candidate between the cluster centroids, and the sound units and the sound unit candidates are determined so that the variance of the frequencies is the largest. Accordingly, the number of sound units or sound unit candidates is not excessively large and thus the acoustic features of a variety of usual sound data can be described satisfactorily.

In the above-mentioned example, the label data generating unit 122 selects the distance candidate $D_1$ in which the calculated variance $\sigma_1$ is the largest (see FIG. 10 and step S310).

The label data generating unit 122 clusters the sound feature vectors depending on the selected distance candidate $D_1$ to divide a vector space of the sound feature vectors into M clusters and specifies the labels of the (M) sound units for each cluster. This embodiment is not limited to this configuration, but the label data generating unit 122 may select the distance candidate $D_1$ in which the mean of the appearance probabilities (recognition likelihoods) of the events calculated from the usual sound data out of the selected distance candidates $D_1$ is greater than a predetermined mean threshold value.

When the number of such distance candidates $D_1$ is two or more, the label data generating unit 122 may select the distance candidate $D_1$ in which the appearance probability is the highest out of the two or more distance candidates $D_1$. Here, the label data generating unit 122 earlier performs the process of clustering the sound feature vectors for each distance candidate $D_1$ to divide the vector space of the sound feature vectors into clusters, specifying the labels of the sound unit candidates for each cluster, and generating the label data. Thereafter, the segmentation data generating unit 123 generates the segmentation data using the sound unit candidate sequence generated based on the specified label data (see step S204a in FIG. 17). The label data generating unit 122 generates the sound unit group candidate sequence of the sound signal for each event included in the usual sound data using the generated label data and the generated segmentation data and calculates the appearance probability (see the segmentation determining unit 106 in FIG. 1). Accordingly, it is possible to improve a correct answer rate of the identified event.

As described above, the sound recognition apparatus (for example, sound recognition apparatus 1) according to this embodiment includes a sound feature value calculating unit (for example, the sound feature value calculating unit 102) that calculates a sound feature value based on an input sound signal. The sound recognition apparatus according to this embodiment includes a label converting unit (for example, the label converting unit 104) that converts the sound feature value into a corresponding label with reference to label data in which sound feature values and labels indicating sound units as constituent units of a sound are correlated. The sound recognition apparatus according to this embodiment includes a sound identifying unit (for example, the sound identifying unit 110) that calculates a probability of each sound unit group sequence that a label sequence including the labels is segmented for each sound unit group with reference to segmentation data indicating a probability that a sound unit sequence including at least one sound unit will be segmented into at least one sound unit group and that identifies a sound event corresponding to the sound unit group sequence selected based on the calculated probability with reference to sound event data indicating the sound unit group sequence for each sound event.

The sound event data may be constituted as a data table in which the sound events and the sound unit group sequences are correlated with each other (see FIG. 5).

Accordingly, the acoustic feature of the input sound signal is expressed by the sound unit group sequence segmented for each sound unit group indicating the temporal variation of the acoustic feature. In the sound recognition apparatus according to this embodiment, the sound event corresponding to the sound unit group sequence selected based on the calculated probability is selected. Accordingly, the sound recognition apparatus according to this embodiment can recognize usual sounds having various acoustic features. The type of an alarm sound emitted from an instrument such as an alarm clock, the operation state based on the operation sound emitted from an instrument, the environment based on an environmental sound, and the like are recognized as the sound event.

Second Embodiment

A second embodiment of the invention will be described below with reference to the accompanying drawings. The same configuration as described above will be referenced by the same reference signs and description thereof will be invoked.

Figure 18:
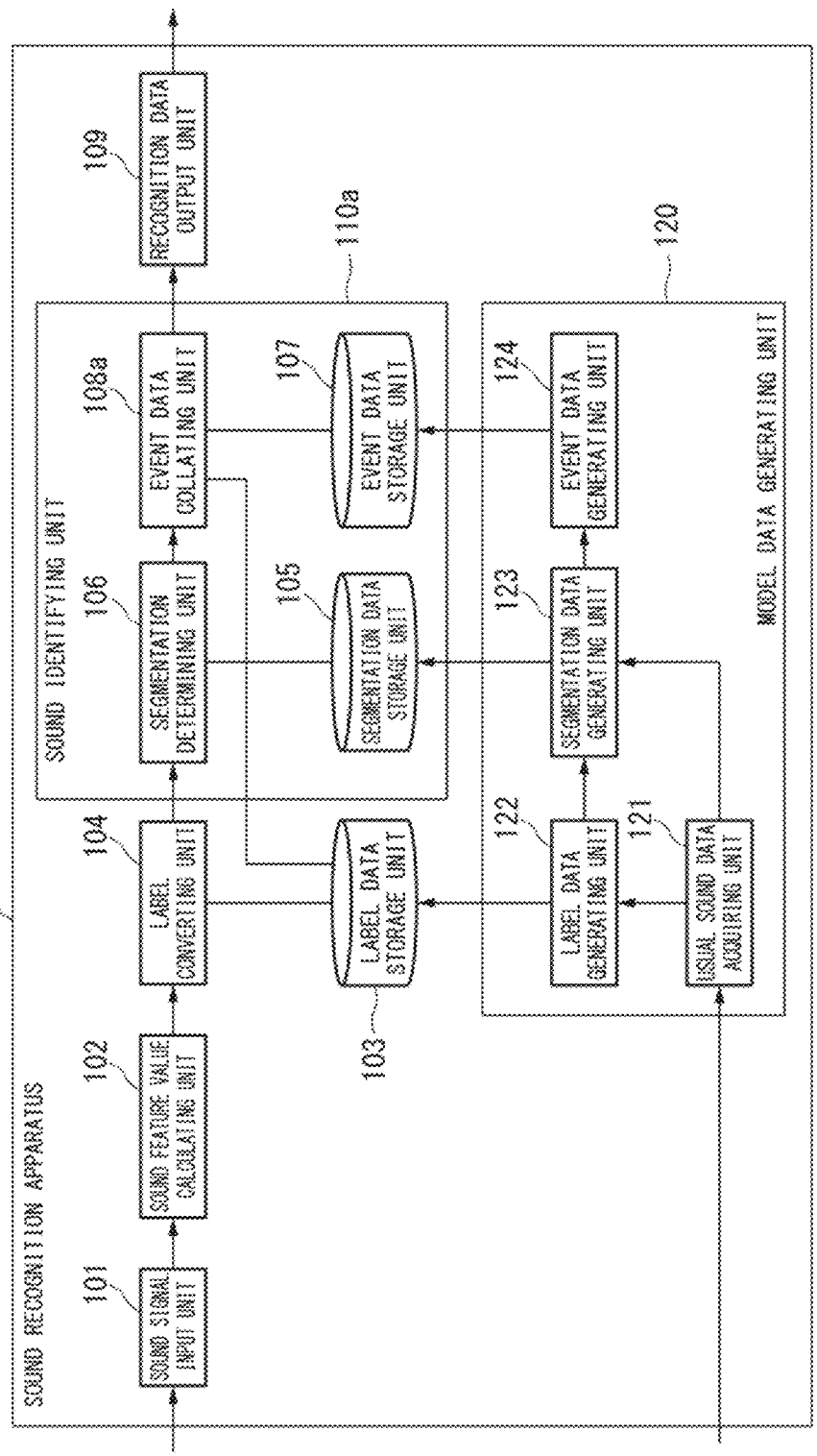
FIG. 18 is a block diagram illustrating a configuration of a sound recognition apparatus according to a second embodiment of the invention.

FIG. 18 is a block diagram illustrating the configuration of a sound recognition apparatus 1a according to the second embodiment.

The sound recognition apparatus 1a includes a sound signal input unit 101, a sound feature value calculating unit 102, a label data storage unit 103, a label converting unit 104, a recognition data output unit 109, a sound identifying unit 110a, and a model data generating unit 120. That is, the sound recognition apparatus 1a includes the sound identifying unit 110a instead of the sound identifying unit 110 in the sound recognition apparatus 1 (FIG. 1).

The sound identifying unit 110a includes a segmentation data storage unit 105, a segmentation determining unit 106, an event data storage unit 107, and an event data collating unit 108a. That is, the sound identifying unit 110a includes an event data collating unit 108a instead of the event data collating unit 108 (FIG. 1) in the sound identifying unit 110.

The event data collating unit 108a may perform a fuzzy search in a collation of a sound unit group sequence input from the segmentation determining unit 106 and a sound unit group sequence indicated by the event data as well as performs the same process as performed by the event data collating unit 108 (FIG. 1). In the fuzzy search, the event data collating unit 108a considers a certain sound unit (first sound unit) and sound units relevant to $N_A$ (where $N_A$ is a predetermined integer, for example, 1) cluster centroids close to the cluster centroid of the first sound unit to be the same sound unit with reference to the label data stored in the label data storage unit 103. The sound units relevant to the $N_A$ cluster centroids close to each other include from the sound unit (second sound unit) relevant to the cluster centroid closest to the cluster centroid of the first sound unit to the sound unit (($N_A$+1)-th sound unit) relevant to the $N_A$-th closest cluster centroid. That is, the event data collating unit 108a collates the sound unit group sequence indicated by the event data with the sound unit group sequences generated by interchanging any of the $N_A$ sound units considered to be the same as the first sound unit. The index indicating the degree of closeness is, for example, an Euclidean distance. Accordingly, the event data collating unit 108a collates the sound unit group sequences indicated by the event data with the $N_d^{N_A+1}$ candidate sequences as for one sound unit group sequence including $N_d$ sound units.

For example, a case is considered in which an input sound unit group sequence $[c_d']$ is $c_1c_2|c_3$ ($c_1$ or the like represents a sound unit and | represents a segmentation), $c_1$ and $c_2$ are equal to each other, and $c_3$ and $c_4$ are considered to be the same ($N_A$=1). At this time, the event data collating unit 108a uses the following eight types of candidate sequences in the collation with the sound unit group sequences indicated by the event data: $c_1c_1c_3$, $c_2c_1c_3$, $c_1c_2c_3$, $c_2c_2c_3$, $c_1c_1c_4$, $c_2c_1c_4$, $c_1c_2c_4$, and $c_2c_2c_4$. Here, the event data collating unit 108a may ignore the segmentation in the collation. Accordingly, it is possible to enhance the noise resistance even when a sound signal having noise mixed therewith is input to the sound signal input unit 101.

Here, the event data collating unit 108a may consider the first sound unit and sound units relevant to the cluster centroids of which the distance from the cluster center of the first sound unit is within a predetermined distance range to be the same sound unit with reference to the label data stored in the label data storage unit 103. In this case, the event data collating unit 108a collates the sound unit group sequences, in which the first sound unit and the other sound units considered to be the same are interchanged, with the sound unit group sequence indicated by the event data. Accordingly, even when the acoustic feature is changed due to noise or the like, the event relevant to the first sound unit is selected for the sound units considered to be the same. That is, the resistance to noise or the like is improved and thus a decrease in recognition rate of the event is prevented.

The event data collating unit 108a may re-calculate the appearance probability for the candidate sequences formed by interchanging the sound unit without ignoring the segmentation with reference to the segmentation data stored in the segmentation data storage unit 105. Only the candidate sequences of which the re-calculated appearance probability is higher than a predetermined probability, for example, $\frac{1}{10}$ of the original sound unit group sequence, may be collated with the sound unit group sequence. Accordingly, it is possible to reduce the processing load of the collation without decreasing the recognition rate.

Sound unit set data indicating a sound unit set which is a set of sound units of which the distance between the corresponding cluster centroids is less than a predetermined distance may be stored in the label data storage unit 103 in advance. Here, the event data collating unit 108a may specify other sound units belonging to the same sound unit set as the first sound unit with reference to the sound unit set data. The event data collating unit 108a may collate the respective sound unit group sequences, in which the first sound unit and the other sound units are interchanged, with the sound unit group sequences indicated by the event data.

As described above, the sound recognition apparatus (for example, the sound recognition apparatus 1a) according to this embodiment has the same configuration as the sound recognition apparatus (for example, the sound recognition apparatus 1) according to the above-mentioned embodiment, and the sound identifying unit (for example, the sound identifying unit 110a) of the sound recognition apparatus according to this embodiment identifies a sound event corresponding to a sound unit group sequence which is generated by interchanging the sound units corresponding to the cluster in which the inter-cluster distance is less than a predetermined distance out of the sound units constituting the selected sound unit group sequence.

Accordingly, candidates of a sound unit group sequence are generated by interchanging the sound units having acoustic features close to each other. Accordingly, the sound recognition apparatus according to this embodiment can identify a desired sound event even when an acoustic feature of an input sound signal varies due to noise or the like, and it is possible to improve resistance to noise or the like.

Examples of Sound Unit Sequence and Sound Unit Group Sequence

Examples of a sound unit sequence output from the label converting unit 104 and a sound unit group sequence output from the segmentation determining unit 106 will be described below.

Figure 19:
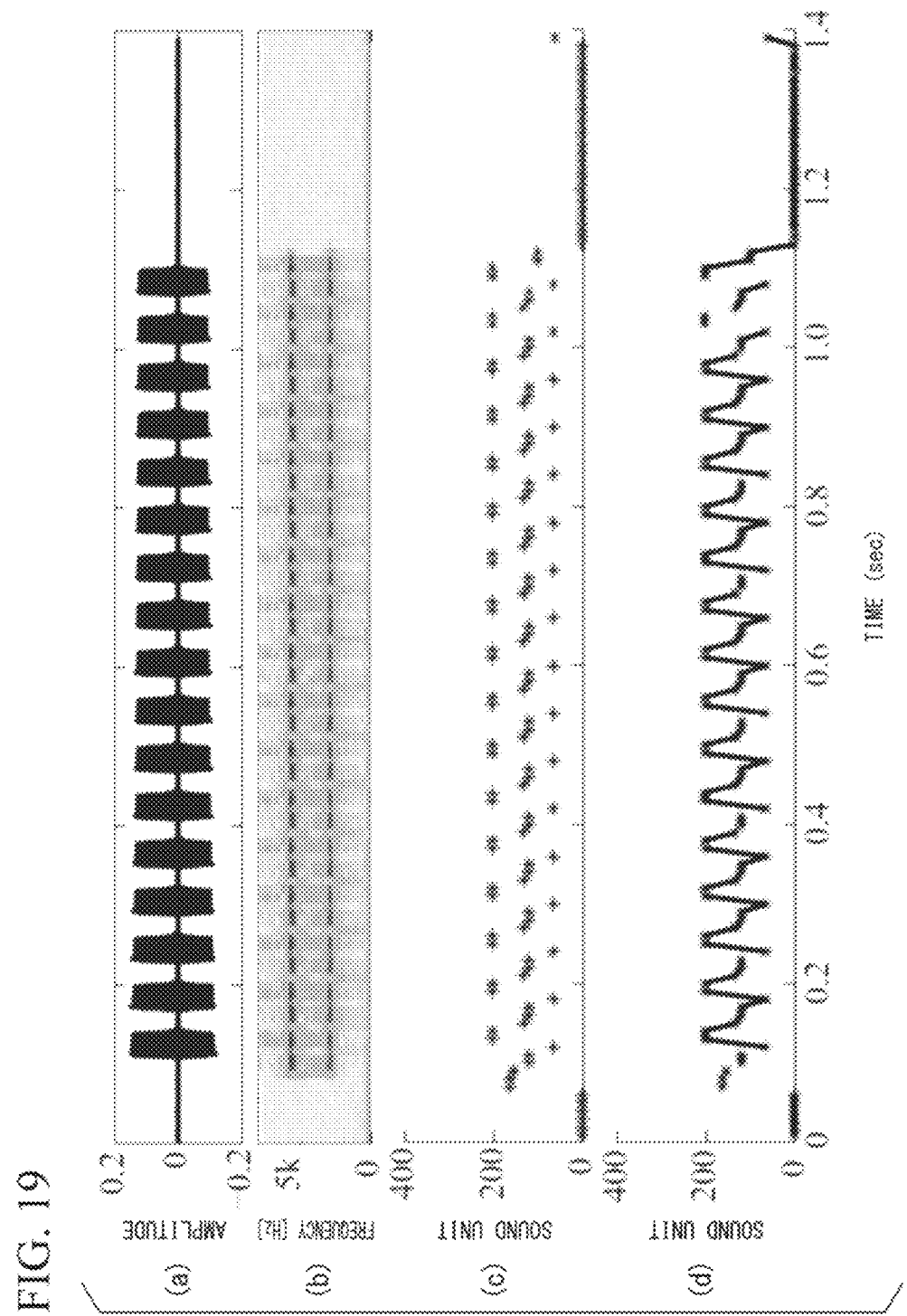
FIG. 19 is a diagram illustrating an example of a sound unit sequence and a sound unit group sequence.

FIG. 19 is a diagram illustrating examples of a sound unit sequence output from the label converting unit 104 and a sound unit group sequence output from the segmentation determining unit 106.

In FIG. 19, in the order from the upper end to the lower end with respect to the drawing surface, part (a) illustrates an input sound signal, part (b) illustrates a spectrogram, part (c) illustrates a sound unit sequence, and part (d) illustrates a sound unit group sequence. In parts (a), (b), (c), and (d) of FIG. 19, the vertical axes represent the amplitude, the frequency, the sound unit number, and the sound unit number, respectively. All the horizontal axes represent the time. In this example, an event is a ringtone of a phone.

Here, the input sound signal is a sound signal input to the sound signal input unit 101 and exhibits an amplified variation with time. The spectrum gram is the power for each frequency of the input sound signal.

The magnitude of the power is expressed by gray scales. The darker part represents the greater power and the lighter part represents the smaller power. As sound unit sequences, sound units at each time are plotted. As sound unit group sequences, lines connecting the plots are marked. Multiple sound units connected with a single line form a single sound unit group. That is, the plots adjacent to each other but not connected by a line indicate that a segmentation is present therebetween.

Part (a) of FIG. 19 illustrates that a ringtone is generated between time 0.1 sec to time 1.12 sec and the waveform of the input sound signal is repeated with a cycle of about 0.06 seconds. Parts (b) to (d) of FIG. 19 illustrate that the spectrogram, the sound units, and the sound unit groups are repeated with a cycle of about 0.06 seconds depending on the input sound signal.

Figure 20:
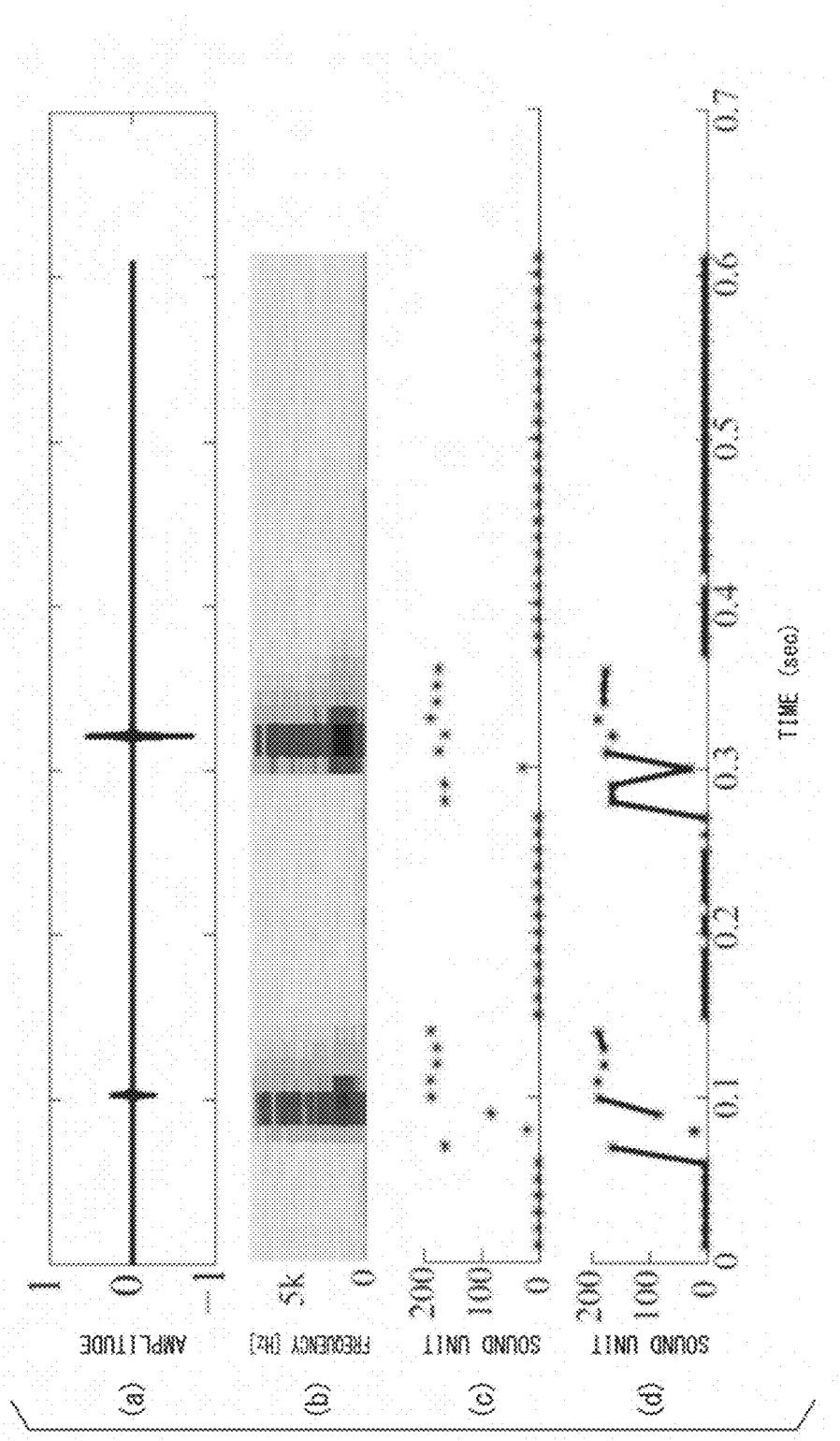
FIG. 20 is a diagram illustrating another example of a sound unit sequence and a sound unit group sequence.

FIG. 20 is a diagram illustrating examples of a sound unit sequence output from the label converting unit 104 and a sound unit group sequence output from the segmentation determining unit 106.

Information represented by parts (a) to (d) of FIG. 20 and the relationships of the vertical axes and the horizontal axes are the same as in parts (a) to (d) of FIG. 19. In this example, the event is clapping.

Part (a) of FIG. 20 illustrates that the amplitude of an input sound signal unexpectedly varies between times 0.1 sec and 3.1 sec and the length of a section having amplitude significantly different from 0 is 0.008 seconds which is very narrow. At times before and after the times, the amplitude is almost 0. Part (b) of FIG. 20 illustrates that the power in a section wider than the input sound signal is significantly different from 0 which is wide. This is because the spectrogram is calculated for each frame of a predetermined time interval. Part (c) of FIG. 20 illustrates that significant sound units of which the number is different from 0 are selected in the section in which the power is significantly different from 0. Part (d) of FIG. 20 illustrates a section having amplitude in which the power of the input sound signal is significantly different from 0 is segmented into sound unit groups.

Evaluation Result

An evaluation result obtained by performing evaluation experiment using the sound recognition apparatus 1a will be described below. The evaluation experiment was performed in a test room with a reverberation time of 0.2 seconds. A humanoid (hereinafter, simply referred to as a robot) was installed almost at the center of the test room, a microphone was installed in the head of the robot, and the sound recognition apparatus 1a was installed in the body section of the robot. Here, the sound signal recorded by the microphone is input to the sound signal input unit 101. A sound source to be used to generate a sound (event) was installed at a position spaced apart 1 m from the microphone.

The sampling frequency of the sound signal input to the sound signal input unit 101 was 16 kHz and each sample was formed as data indicating 16-bit amplitude values. The frame length and the shift length at the time of calculating sound feature vectors were 512 samples and 160 samples, respectively.

The following data was used as usual sound data (learning data set) used to generate label data, segmentation data, and event data by preliminary learning or a sound signal (evaluation data set) used to generate a sound from the sound source. (1) Environmental sound data set: RWCP-SSD (Real World Computing Partnership-Sound Speech Database) which includes 92 types of environmental data (for example, a ringtone of a phone or clapping) for 4 minutes. (2) Musical data set: RWC-MDB-G (Real World Computing-Music Database-G) which includes 32 types of musical data (for example, popular music or ballet music) for 5 minutes. (3) Speech data set: ATR (Advanced Telecommunications Research Institute International) dataset which includes speeches of 216 words uttered by five male speakers and five female speakers.

In the preliminary learning and the evaluation, K-fold cross-validation was carried out on the data set. In the cross-validation, a data set was divided into K (where K is an integer greater than 1, for example, K=5 in this case) parts, the preliminary learning was carried out using K−1 data sets, and the evaluation was carried out using the other one data set. In the preliminary learning, only data (clean speech) in an environment having no noise was used. The evaluation was carried out by using an operation sound of a fan of the robot as noise and setting the SN ratio thereof in multiple steps. The SN ratio (dB) was given to be 20 log 10($\pi_s/(1-\pi_s)$) and the control parameter $\pi_s$ was set to eight values of 1, 0.95, 0.9, 0.85, 0.8, 0.7, 0.5, and 0.3. At this time, the SN ratio was respectively ∞ (no noise), 12.8, 9.5, 7.5, 6.0, 3.7, 0.0, and −3.7.

In the preliminary learning and the evaluation, label data and segmentation data constituted by a statistical model were learned and the learned label data and segmentation data were used for the evaluation. In a first evaluation experiment, the evaluation results when the GMM was used as the statistical model (this embodiment) and when the GMM was used as the statistical model and labels are manually added (GMM-S) were compared in order to evaluate noise resistance (robustness) of the sound units determined by performing the LDA method in this embodiment. In this embodiment, the number of sound units M was 96. In the GMM-S, the number of sound units was 126. The number 126 is the total sum (2+32+92) of the numbers of events included in the data set. The average frame correct answer rates of the events were used as the evaluation results.

FIG. 21 is a diagram illustrating an example of the average frame correct answer rate.

In FIG. 21, the SN ratio, the GMM-S, and this embodiment are illustrated in the order from the leftmost column to the right side.

When the SN ratio is ∞, the correct answer rate of the GMM-S was 82.1% which was higher than 74.1% of this embodiment, but in the other cases, the correct answer rates of this embodiment were higher by 2% to 9% than the correct answer rates of the GMM-S. For example, when the SN ratio was 6.0 dB, the correct answer rate of this embodiment was 33.4% which was higher than the correct answer rate 24.1% of the GMM-S. This result means that the noise resistance was improved according to this embodiment.

In a second evaluation experiment, the average frame correct answer rates when this embodiment was applied, when the HMM was used as the statistical model and a unigram was applied (MONO-D, mono-phone model), and when a fuzzy search (see the event data collating unit 108a of FIG. 18) was performed (MONO-P) in that case were compared as the evaluation results in order to evaluate the noise resistance of sound unit groups determined using the segmentation data in this embodiment. The application of a unigram means that a higher order of occurrence probabilities than the unigram (the occurrence probability of only the sound unit group) was not used in the segmentation data. Here, the number of states and the mixed number in the HMM were set to 1 and 16.

FIG. 22 is a diagram illustrating another example of the average frame correct answer rate.

In FIG. 22, the SN ratio, this embodiment, the MONO-D, and the MONO-P are illustrated in the order from the leftmost column to the right side.

In the MONO-D, the correct answer rate was lower by 2% to 9% than that in this embodiment regardless of the SN ratio.

For example, when the SN ratio was 9.5 dB, the correct answer rate in this embodiment was 41.7% but the correct answer rate in the MONO-D was 33.3%. This is because the higher order of occurrence probabilities are not considered in the model and thus the temporal variation does not occur among the sound unit groups.

In the MONO-P, the correct answer rate was higher by 7% to 14% than the correct answer rate in the MONO-D. For example, when the SN ratio is 12.8 dB, the correct answer rate in the MONO-P was 42.5% but the correct answer rate in the MONO-D was 53.1% which was higher than the correct answer rate 50.1% in this embodiment.

In the MONO-P, except for the case where the SN ratio was ∞, the correct answer rate was higher by 5% to 13% and by 5% to 18% than the correct answer rates in this embodiment and the GMM-S. This result means that the noise resistance was improved by the fuzzy search of the event data collating unit 108a.

The process of generating model data used to identify a usual sound is manually performed but the processing load thereof is generally vast. It is possible to efficiently generate model data by performing the above-mentioned model data generating process (see FIGS. 7 and 17). In this embodiment, the label data indicating the sound units that can satisfactorily express features of usual sounds having more various features than human speeches and the segmentation data indicating statistical characteristics of the sound units or the sound unit groups indicating the time series of the sound units are generated as the model data. Accordingly, it is possible to obtain a higher correct answer rate than a case where manually-prepared model data is used by using the generated model data.

The example where the label data includes data indicating a category centroid for each category has been described above, but the invention is not limited to this example. The label data only has to be data capable of classifying the sound feature vector into any of multiple categories. For example, the label data may be data indicating the boundary between the categories adjacent to each other in the vector space of the sound feature vectors.

The example where the label converting unit 104, the event data collating unit 108a, and the label data generating unit 122 use the Euclidean distance as the distance index has been described above, but the invention is not limited to this example. The label converting unit 104, the event data collating unit 108a, and the label data generating unit 122 may use a different index as the distance index. For example, a Minkowski distance which is obtained by generalizing the Euclidean distance and a Maharanobis' generalized distance may be used as the different index.

The sound recognition apparatuses 1 and 1a may include speech determining unit that determines whether an input sound signal is speech uttered by a person. An acoustic model used in the speech recognizing process in the related art in addition to the label data may be stored in the label data storage unit 103. A language model used in the speech recognizing process in the related art in addition to the segmentation data may be stored in the segmentation data storage unit 105. The speech determining unit determines that the input sound signal is speech, for example, when the power of the sound signal is greater than a predetermined power threshold value and the number of zero crossings per unit time of the sound signal is within a predetermined range, and determines that the input sound signal is non-speech otherwise. The number of zero crossings is the total sum of the number of times in which the amplitude is changed from a negative value less than 0 to a positive value greater than 0 and the number of times in which the amplitude is changed from a positive value to a negative value. When the speech determining unit determines that the input sound signal is non-speech, the label converting unit 104 generates a sound unit sequence using the label data and the segmentation determining unit 106 generates a sound unit group sequence using the segmentation data. When the speech determining unit determines that the input sound signal is speech, the label converting unit 104 generates a phoneme sequence using an acoustic model and the segmentation determining unit 106 generates a word sequence using a language model. The segmentation determining unit 106 outputs the generated word sequence as recognition data to the outside of the sound recognition apparatuses 1 and 1a via the recognition data output unit 109. Accordingly, recognition data indicating speech details is output when speech is input, and recognition data indicating an event is output when non-speech is input.

Parts of the sound recognition apparatuses 1 and 1a according to the above-mentioned embodiments, for example, the sound feature value calculating unit 102, the label converting unit 104, a segmentation determining unit 106, and the event data collating units 108 and 108a, may be embodied by a computer. In this case, the parts of the sound recognition apparatuses may be embodied by recording a program for performing the control functions on a computer-readable recording medium and reading and executing the program recorded on the recording medium into a computer system. Here, the "computer system" is a computer system incorporated into the sound recognition apparatuses 1 and 1a and is assumed to include an OS or hardware such as peripherals. Examples of the "computer-readable recording medium" include storage devices such as portable mediums such as a flexible disk, a magneto-optical disk, a ROM, and a CD-ROM and a hard disk incorporated into a computer system. The "computer-readable recording medium" may include a medium that dynamically holds a program for a short time like a communication line when a program is transmitted via a network such as the Internet or a communication circuit such as a telephone circuit or a medium that holds a program for a predetermined time like a volatile memory in a computer system serving as a server or a client in that case. The program may be configured to realize part of the above-mentioned functions or may be configured to realize the above-mentioned functions by collation with a program recorded in advance in a computer system.

All or part of the sound recognition apparatuses 1 and 1a according to the above-mentioned embodiments and the modification example may be embodied by an integrated circuit such as a large scale integration (LSI) circuit. The functional blocks of the sound recognition apparatuses 1 and 1a may be individually incorporated into processors, or part or all thereof may be integrated and incorporated into a processor. The integration circuit technique is not limited to the LSI, but may be embodied by a dedicated circuit or a general-purpose processor. When an integration circuit technique appears as a substituent of the LSI with advancement in semiconductor technology, an integrated circuit based on the technique may be used.

While exemplary embodiments of the invention have been described in detail with reference to the accompanying drawings, the specific configurations are not limited to the above-mentioned configurations but can be modified in design in various forms without departing from the gist of the invention.

What is claimed is:
1. A sound recognition apparatus comprising:
a processor; and
a microphone that collects an acoustic sound, transforms the acoustic sound to a sound signal, and outputs the sound signal to the processor, wherein the processor is programmed with instructions that, when executed, causes the processor to function as:
a speech determining unit that determines that the sound signal is non-speech;
a sound feature value calculating unit which is configured to calculate a sound feature value based on the sound signal output by the microphone;

a label converting unit which is configured to convert the sound feature value calculated by the sound feature value calculating unit into a corresponding label with reference to label data in which sound feature values and labels indicating sound units as constituent units of a sound are correlated;

a sound identifying unit which is configured to calculate a probability of each sound unit group sequence that a label sequence, including the labels converted by the label converting unit, is segmented for each sound unit group, with reference to segmentation data indicating a probability that a sound unit sequence, including at least one sound unit, will be segmented into at least one sound unit group, and which is configured to identify a sound event corresponding to the sound unit group sequence selected based on the calculated probability with reference to sound event data indicating the sound unit group sequence for the sound event; and a recognition data output unit for outputting the sound event when the sound signal is non-speech, wherein the label data indicates a correlation between a cluster, which is part of a vector space of the sound feature value, and the label, and wherein a distance candidate of the cluster is selected so that a variance of frequencies at which the sound unit appears in the sound unit group is greater than a predetermined variance, wherein the frequency indicates a number of times the sound unit appears in the sound unit group.

2. The sound recognition apparatus according to claim 1, wherein the segmentation data is a probability model indicating an appearance probability of the sound unit group and an appearance probability of a next sound unit group when at least one sound unit group is given.

3. The sound recognition apparatus according to claim 1, wherein the sound identifying unit is configured to identify a sound event corresponding to a sound unit group sequence which is generated by interchanging the sound units corresponding to clusters between which a distance is smaller than a predetermined distance out of the sound units constituting the selected sound unit group sequence.

4. A sound recognition method in a sound recognition apparatus, comprising:

a sound feature value calculating step of calculating a sound feature value based on a sound signal output by a microphone, wherein the microphone collects an acoustic sound, transforms the acoustic sound to a sound signal, and outputs the sound signal to a processor;

a speech determining step of determining that the sound signal is non-speech;

a label converting step of converting the calculated sound feature value into a corresponding label with reference to label data which is stored in a label data storage unit and in which sound feature values and labels indicating sound units as constituent units of a sound are correlated;

a sound identifying step of calculating a probability of each sound unit group sequence that a label sequence, including the labels, is segmented for each sound unit group, with reference to segmentation data which is stored in a segmentation data storage unit, and which indicates a probability that a sound unit sequence, including at least one sound unit, will be segmented into at least one sound unit group, and identifying a sound event corresponding to the sound unit group sequence selected based on the calculated probability, with reference to sound event data, indicating the sound unit group sequence for the sound event which is stored in an event storage unit; and a recognition data output step for outputting the sound event when the sound signal is non-speech, wherein the label data indicates a correlation between a cluster, which is part of a vector space of the sound feature value, and the label and a distance candidate of the cluster is selected so that a variance of frequencies at which the sound unit appears in the sound unit group is greater than a predetermined variance, wherein the frequency indicates a number of times the sound unit appears in the sound unit group.

5. A non-transitory computer-readable recording medium having a sound recognition program recorded thereto so as to cause a computer of a sound recognition apparatus to perform:

a sound feature value calculating procedure of calculating a sound feature value based on a sound signal output by a microphone, wherein the microphone collects an acoustic sound, transforms the acoustic sound to a sound signal, and outputs the sound signal to a processor;

a speech determining procedure of determining that the sound signal is non-speech;

a label converting procedure of converting the calculated sound feature value into a corresponding label with reference to label data which is stored in a label data storage unit and in which sound feature values and labels indicating sound units as constituent units of a sound are correlated;

a sound identifying procedure of calculating a probability of each sound unit group sequence that a label sequence, including the labels, is segmented for each sound unit group, with reference to segmentation data which is stored in a segmentation data storage unit, and which indicates a probability that a sound unit sequence, including at least one sound unit, will be segmented into at least one sound unit group, and identifying a sound event corresponding to the sound unit group sequence selected based on the calculated probability, with reference to sound event data, indicating the sound unit group sequence for the sound event which is stored in an event storage unit; and a recognition data output procedure for outputting the sound event when the sound signal is non-speech, wherein the label data indicates a correlation between a cluster, which is part of a vector space of the sound feature value, and the label and a distance candidate of the cluster is selected so that a variance of frequencies at which the sound unit appears in the sound unit group is greater than a predetermined variance, wherein the frequency indicates a number of times the sound unit appears in the sound unit group.

* * * * *